(12) United States Patent
Tsunoo

(10) Patent No.: US 7,454,016 B2
(45) Date of Patent: Nov. 18, 2008

(54) DATA ENCRYPTION SYSTEM AND METHOD

(75) Inventor: Yukiyasu Tsunoo, Tokyo (JP)

(73) Assignee: NEC Corporation (JP)

( * ) Notice: Subject to any disclaimer, the term of this patent is extended or adjusted under 35 U.S.C. 154(b) by 884 days.

(21) Appl. No.: 10/669,269

(22) Filed: Sep. 25, 2003

(65) Prior Publication Data

US 2004/0062391 A1 Apr. 1, 2004

(30) Foreign Application Priority Data

Sep. 26, 2000 (JP) ............................. 2002-280469

(51) Int. Cl.
*H04K 1/00* (2006.01)
*H04L 9/00* (2006.01)
*H04L 9/28* (2006.01)

(52) U.S. Cl. ............................. 380/29; 380/28; 380/42; 711/113; 711/118

(58) Field of Classification Search ................... 380/42, 380/28–29; 711/113, 118
See application file for complete search history.

(56) References Cited

U.S. PATENT DOCUMENTS

| 4,888,741 | A * | 12/1989 | Malinowski | 365/230.05 |
| 5,241,635 | A * | 8/1993 | Papadopoulos et al. | 712/201 |
| 5,493,667 | A * | 2/1996 | Huck et al. | 711/125 |
| 5,752,031 | A * | 5/1998 | Cutler et al. | 718/103 |
| 6,138,209 | A * | 10/2000 | Krolak et al. | 711/128 |
| 6,654,874 | B1 * | 11/2003 | Lee | 712/209 |
| 6,725,329 | B1 * | 4/2004 | Ng et al. | 711/113 |
| 6,772,348 | B1 * | 8/2004 | Ye | 726/13 |
| 6,795,897 | B2 * | 9/2004 | Benveniste et al. | 711/118 |
| 2003/0161172 | A1 * | 8/2003 | Civlin | 365/49 |

FOREIGN PATENT DOCUMENTS

JP 10-222065 8/1998
WO -WO 01/52069 A2 7/2001

OTHER PUBLICATIONS

Kelsey et al., "Side Channel Cryptanalysis of Product Ciphers", 2000, Journal of Computer Security, v.8, n2-3, pp. 141-158.*
Menezes et al., "Handbook of Applied Crytography", CRC Press, pp. 252-259 (1997).
European Search Report dated Dec. 10, 2004.
Tsunoo et al., "Cryptanalysis of DES Implemented on Computers with Cache", Lecture Notes on Computer Science, vol. 2779, pp. 62-76 (2003).

(Continued)

*Primary Examiner*—Minh Dieu Nguyen
(74) *Attorney, Agent, or Firm*—Dickstein, Shapiro, LLP.

(57) ABSTRACT

A data encryption system implemented by running on a cache-equipped computer an encryption program including transformation tables each of which contains a predetermined number of entries. All or necessary ones of the transformation tables are loaded into the cache memory before encryption/decryption process. This causes encryption/decryption time to be made substantially equal independently of the number of operation entries for the transformation table. It is very difficult to extract plain texts used to determine a key differential, resulting in difficulties in cryptanalysis.

12 Claims, 17 Drawing Sheets

OTHER PUBLICATIONS

Borst et al., Computer Networks, vol. 36, pp. 423-435 (2001).
Japanese Office Action dated May 20, 2003 (and English translation of relevant portion).
Japanease Office Action dated Aug. 26, 2003 (and English traslation of relevant portion).
Paul C. Kocher, "Timing Attacks on implementations of Diffie-Hellman, RSAm DSS, and Other Systems", Cryptography Research, Inc., 607 Market Street, 5th Floor, San Francisco, CA 94105, U.S.A.

Mitsubishi Electric Corporation, "Block Cipher Algorithms MISTY1 and MISTY2", Version 1.11 (Oct. 2, 1996).
Mitsubishi Electric Corporation, "Sample Programs of MISTY1 in C Language", Version 1.00 (Jul. 22, 1996).
D. Page, "Theoretical Use of Cacke Memory as a Cryptanalytic Side-Channel", University of Bristol, Department of Computer Science pp. 1-24 (Aug. 2002).
"Lecture", bit, vol. 28, NO. 11, (pp. 1-5), Nov. 1996.

\* cited by examiner

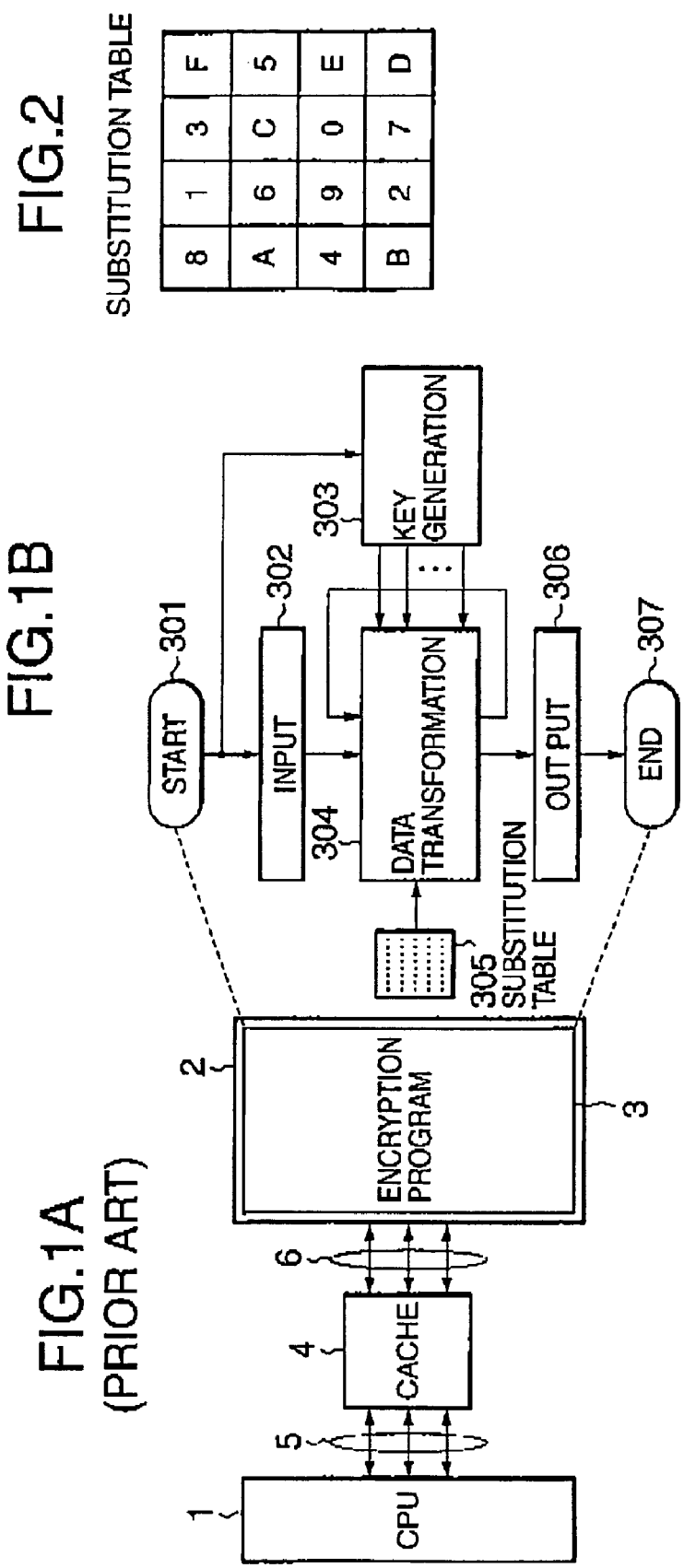

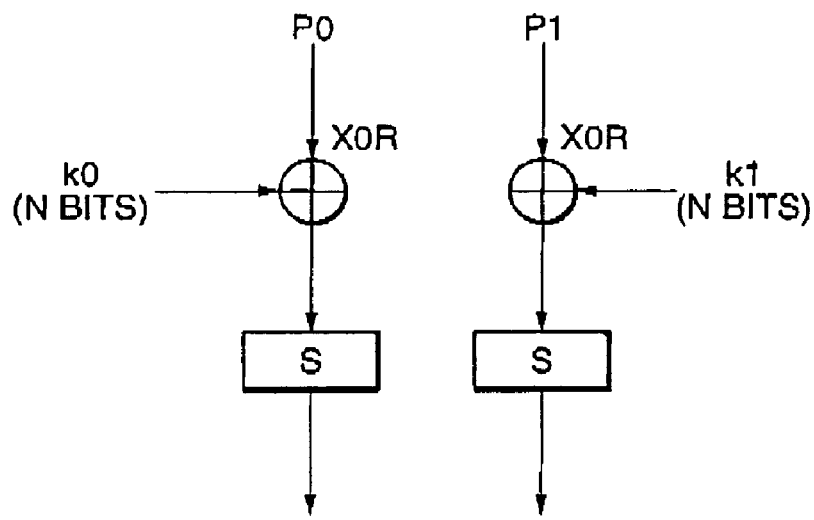

FUNCTION $FL_i$

FUNCTION $FO_i$

FUNCTION $FI_{ij}$

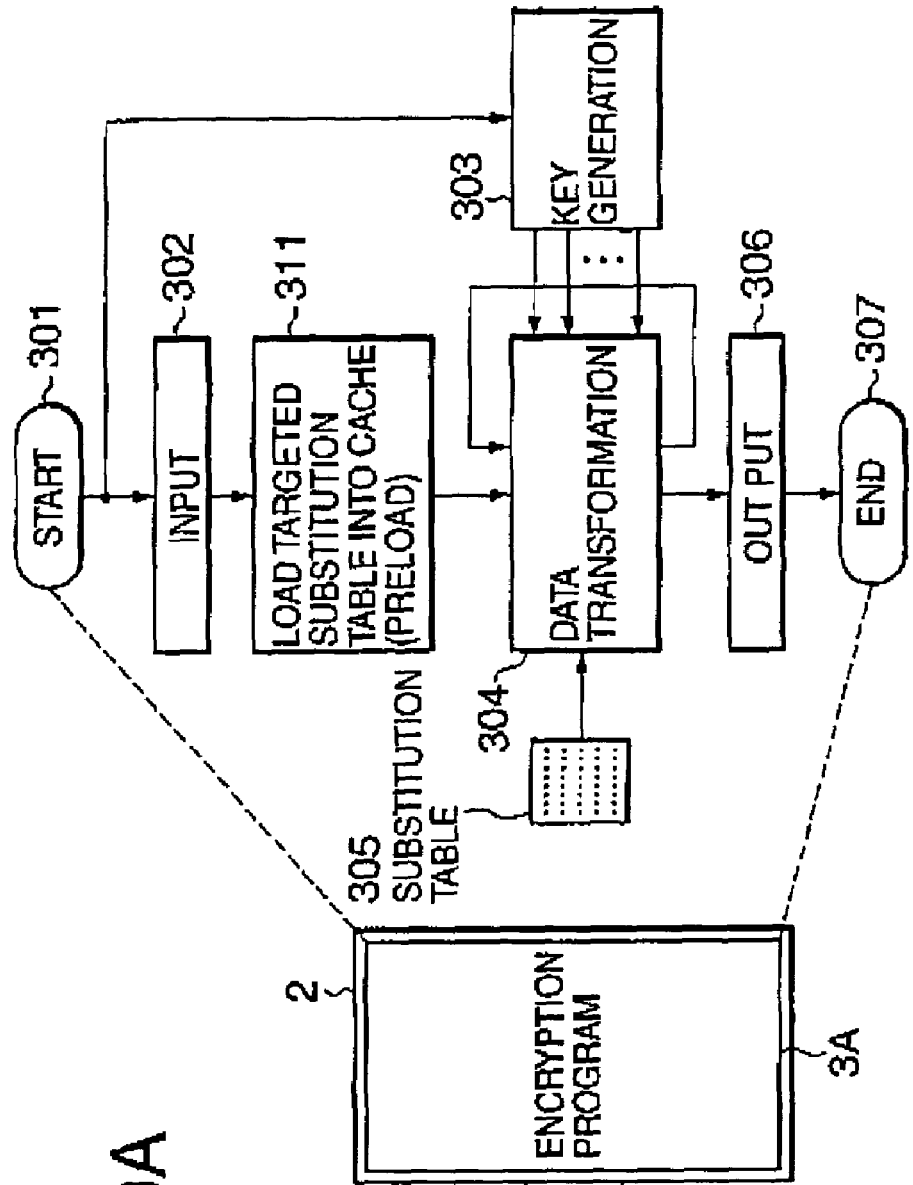
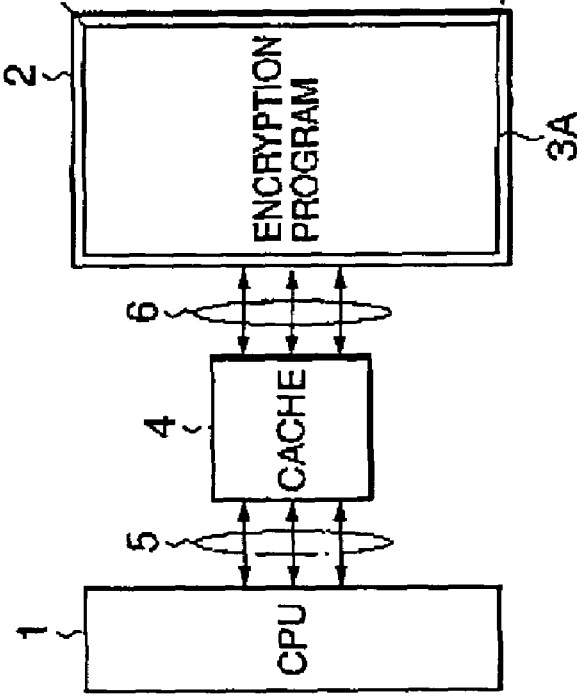

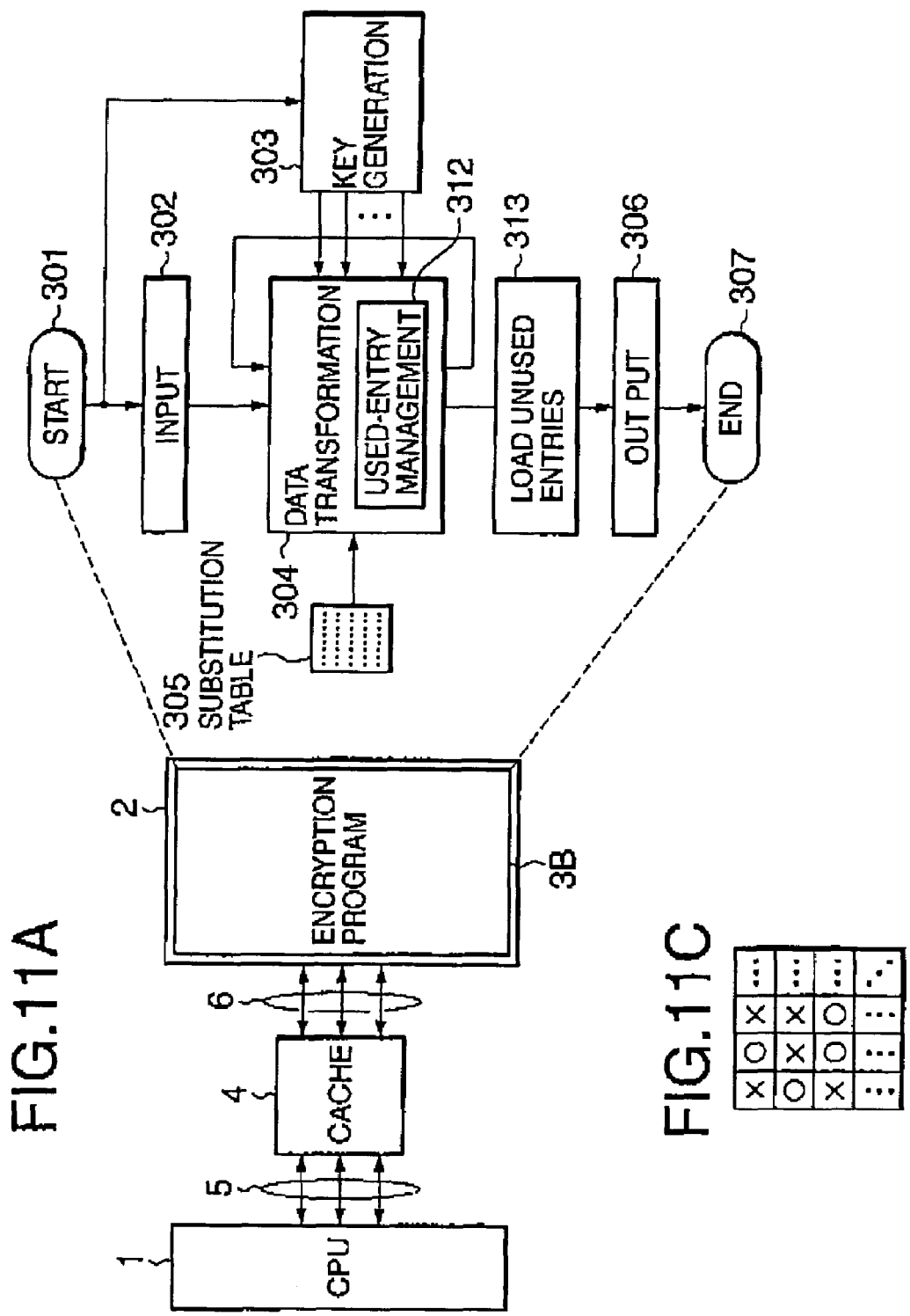

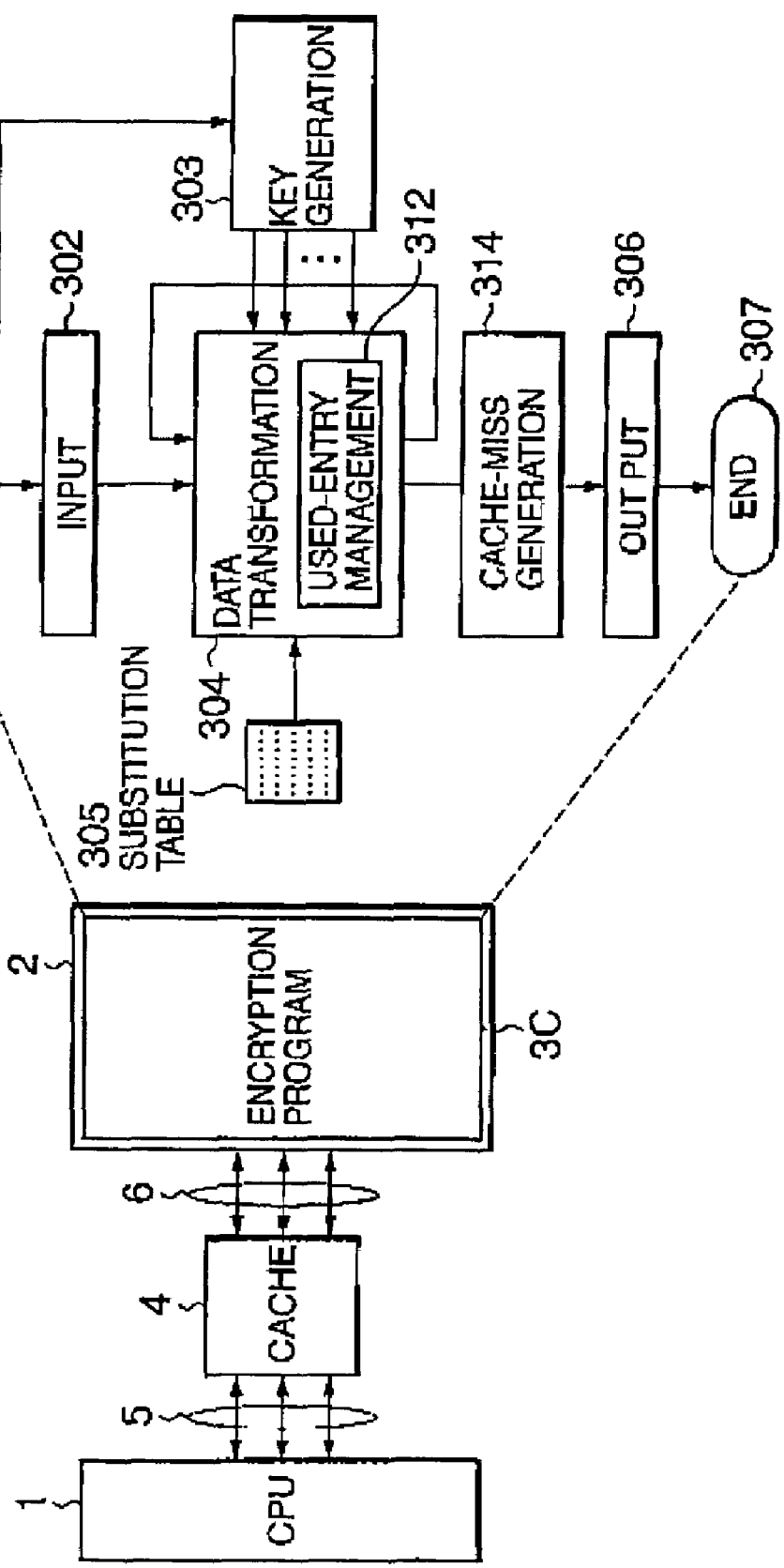

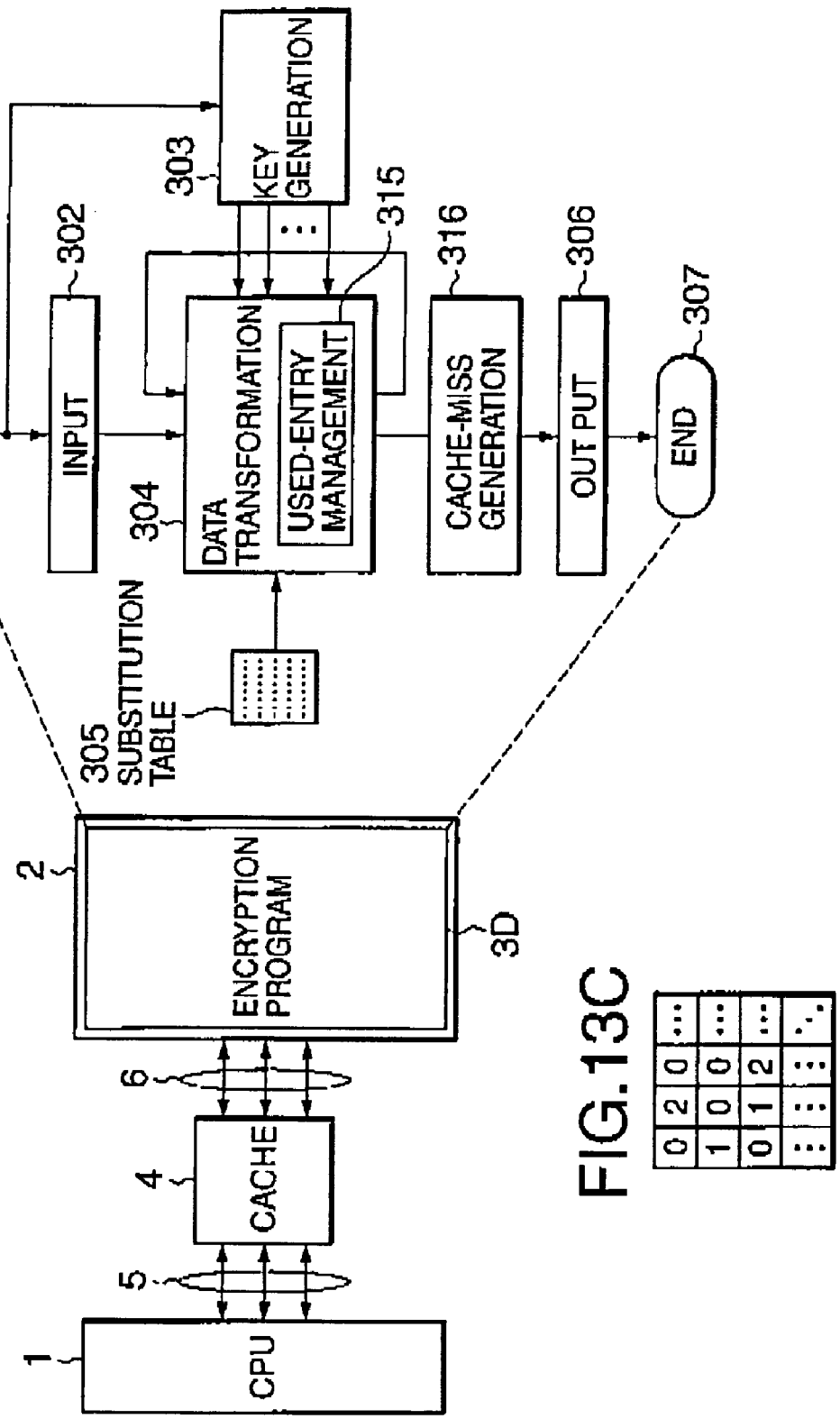

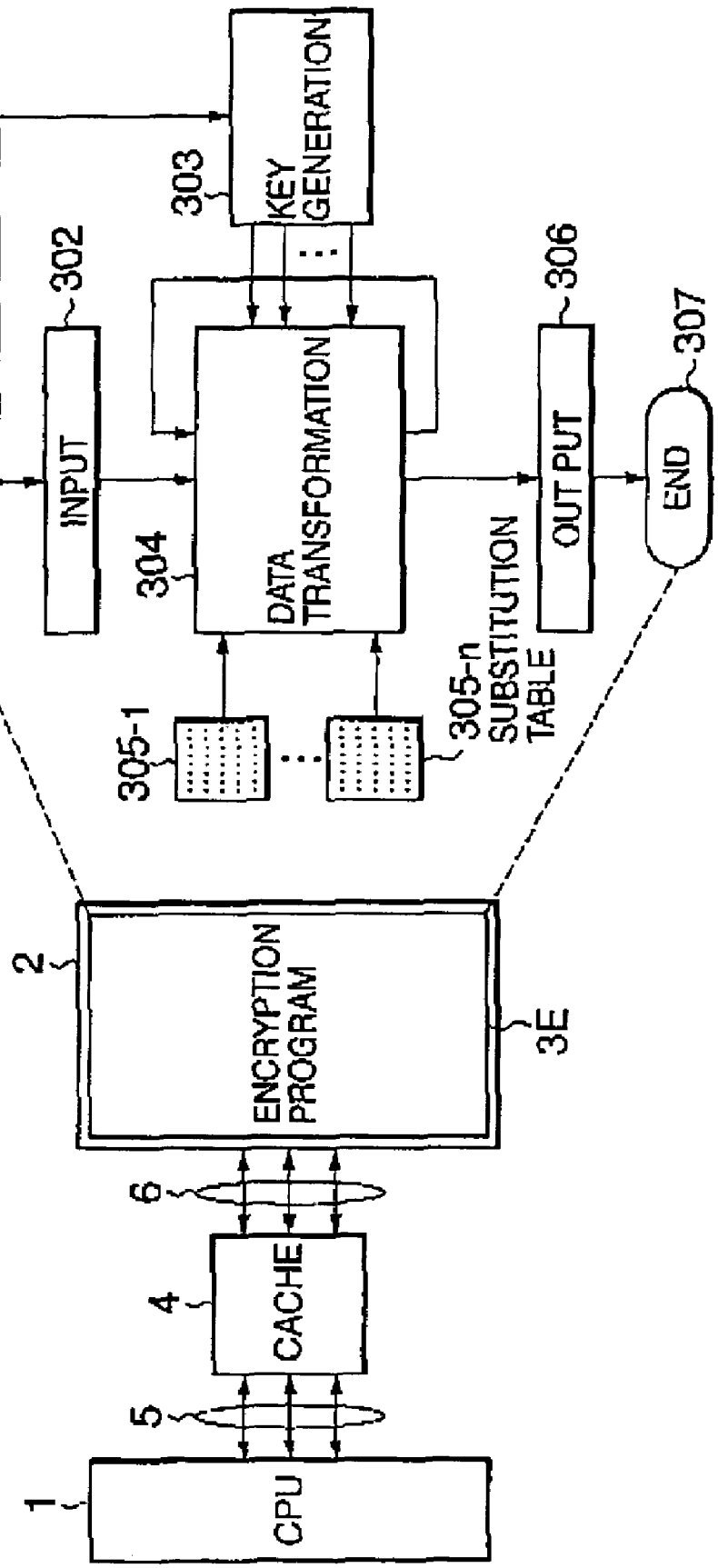

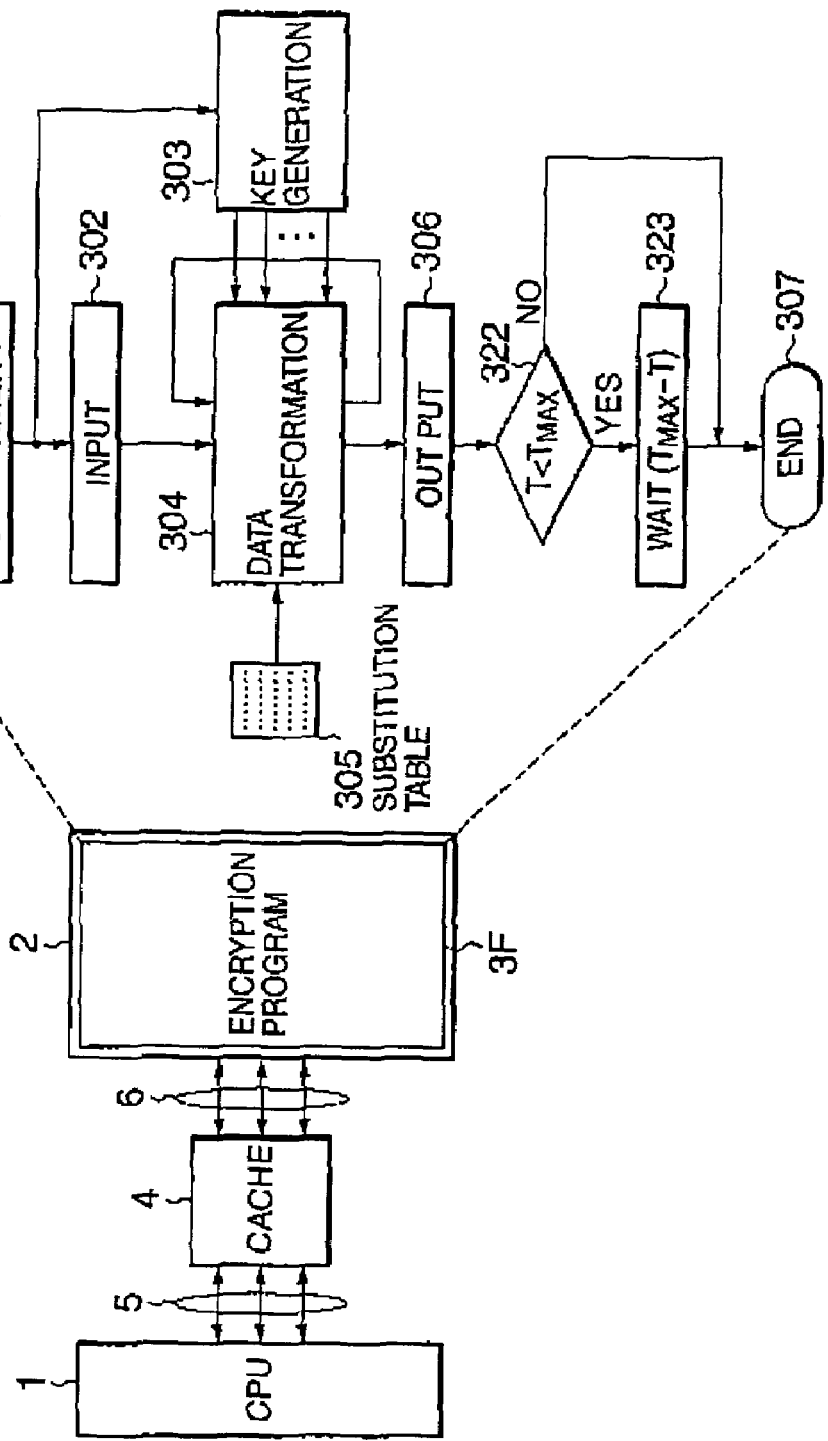

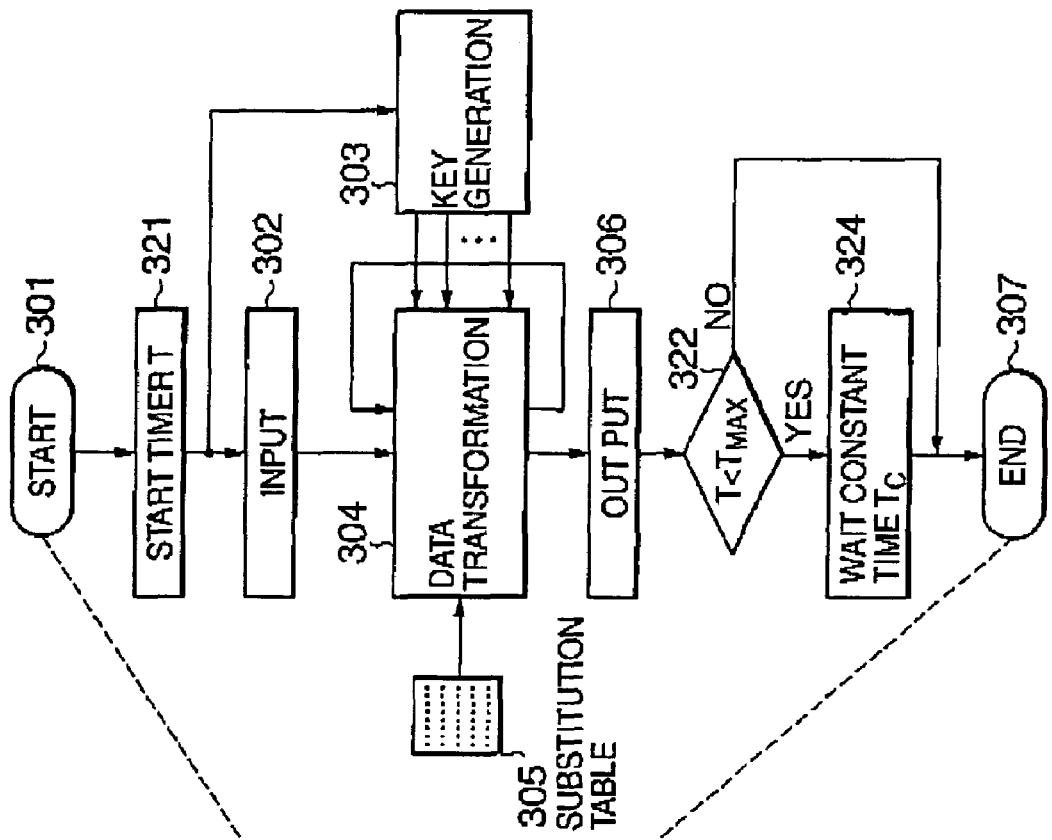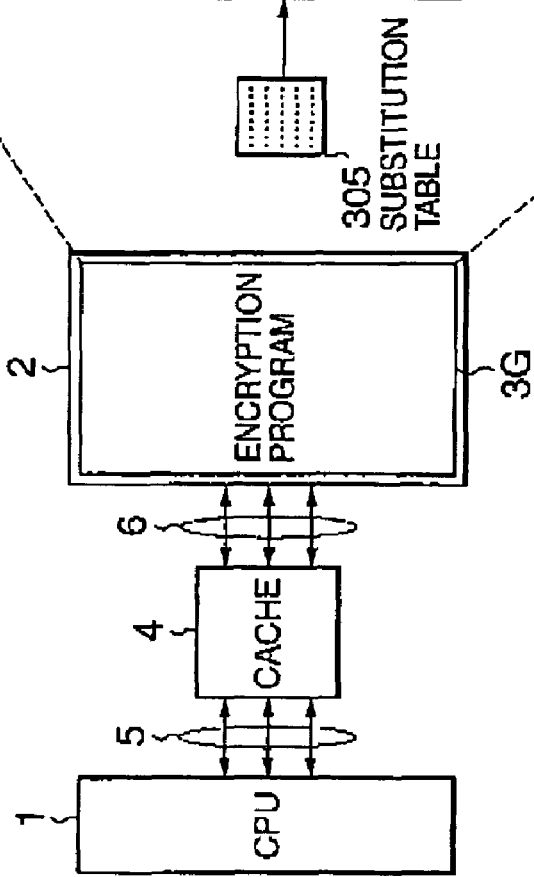

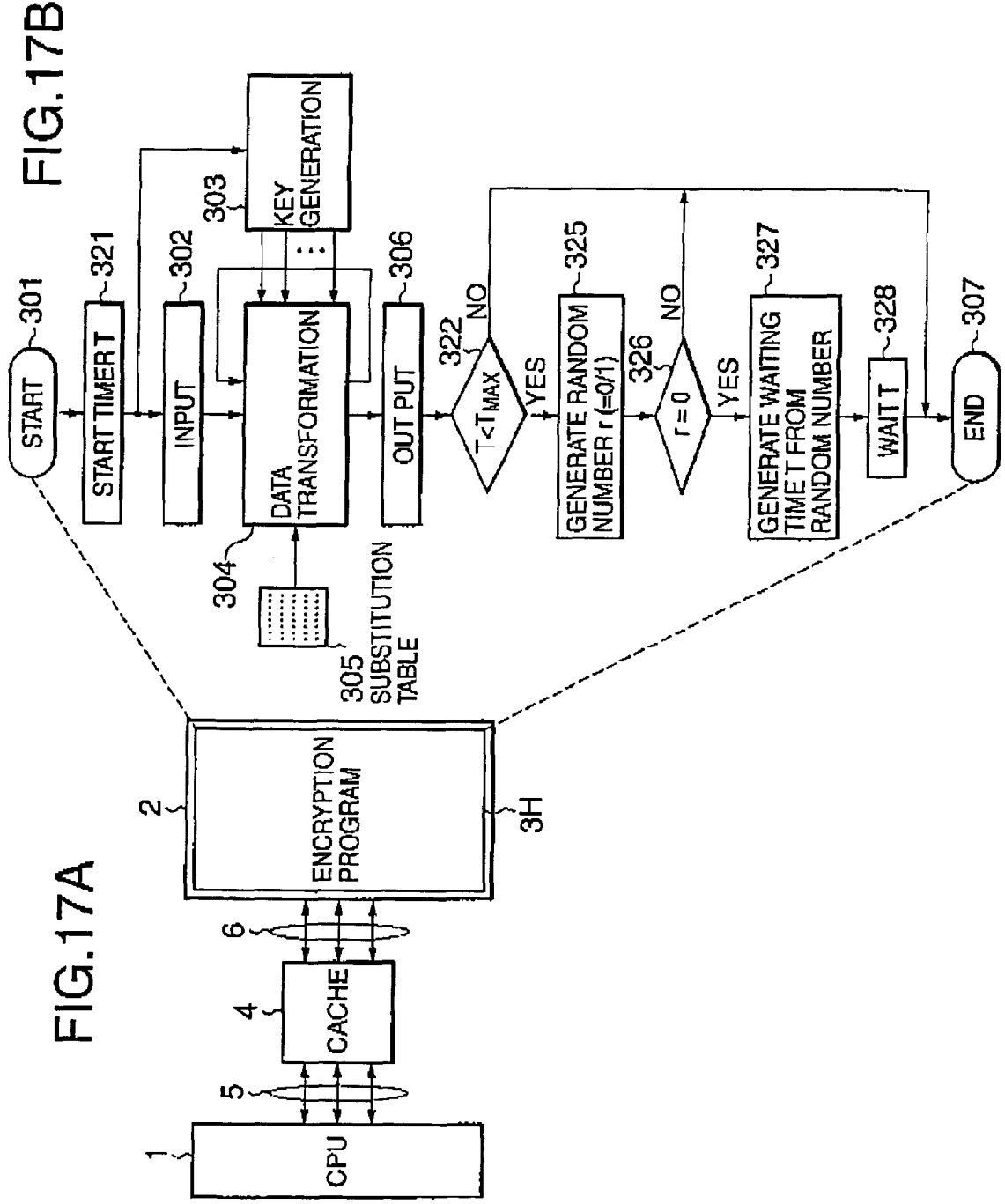

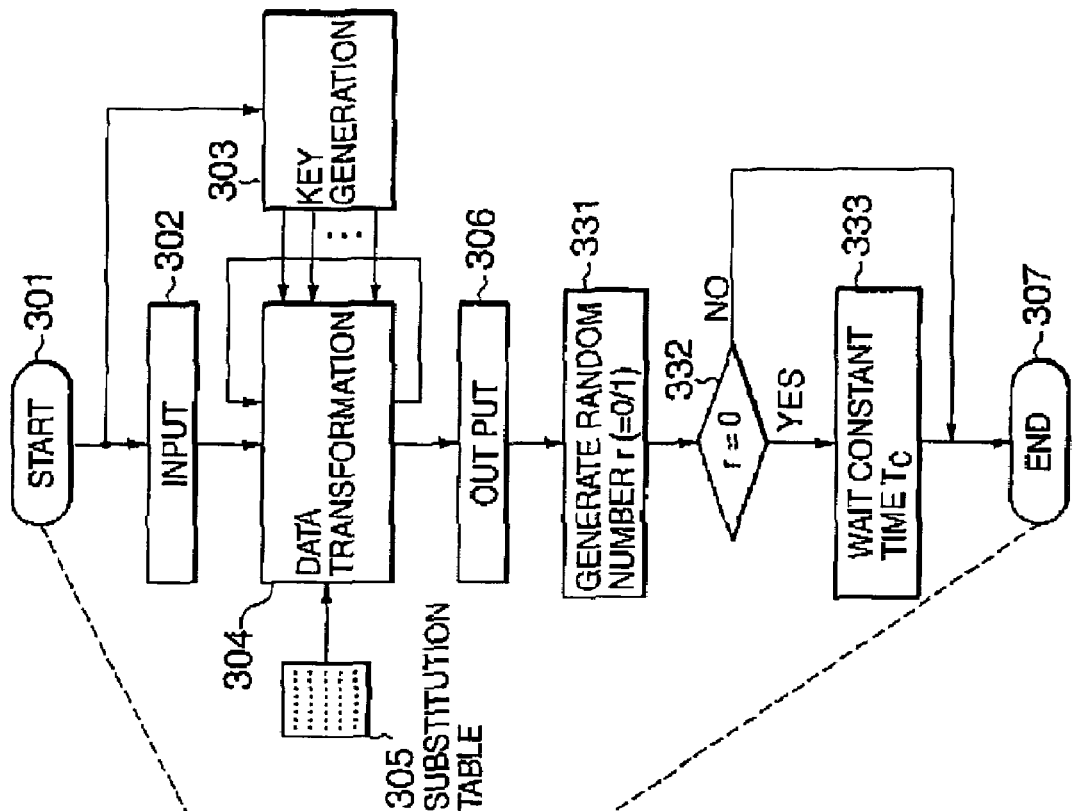
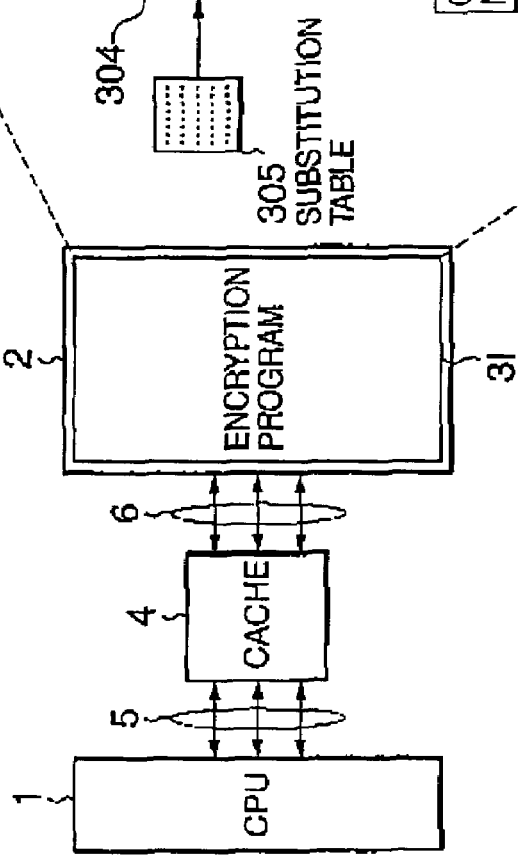
FIG. 18A
FIG. 18B

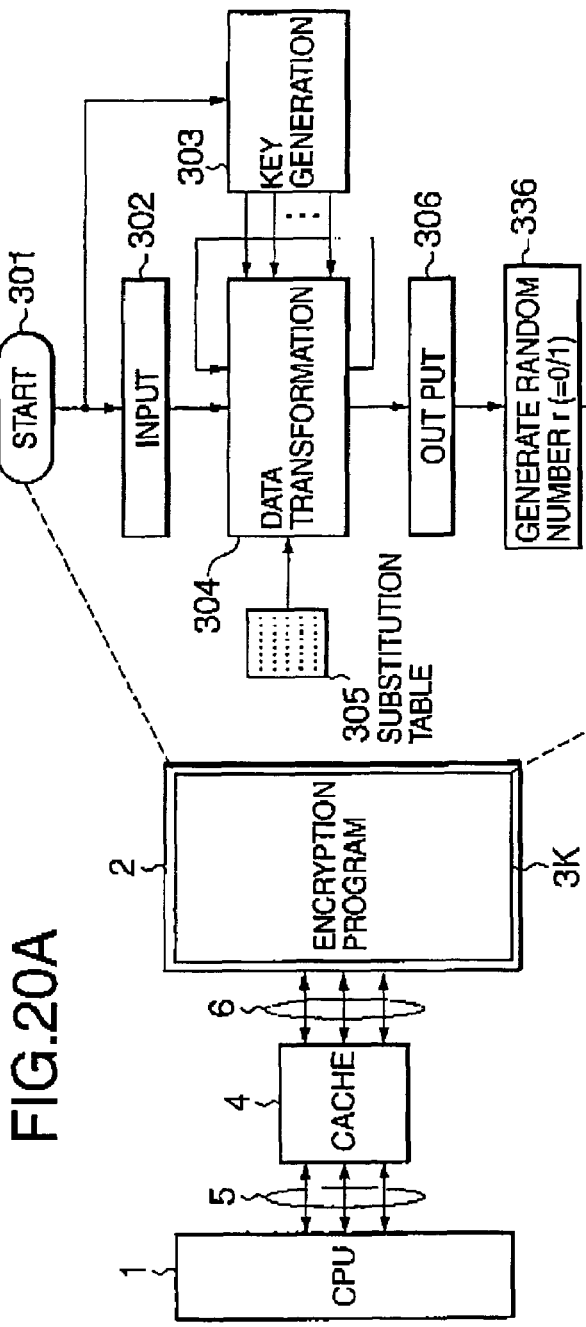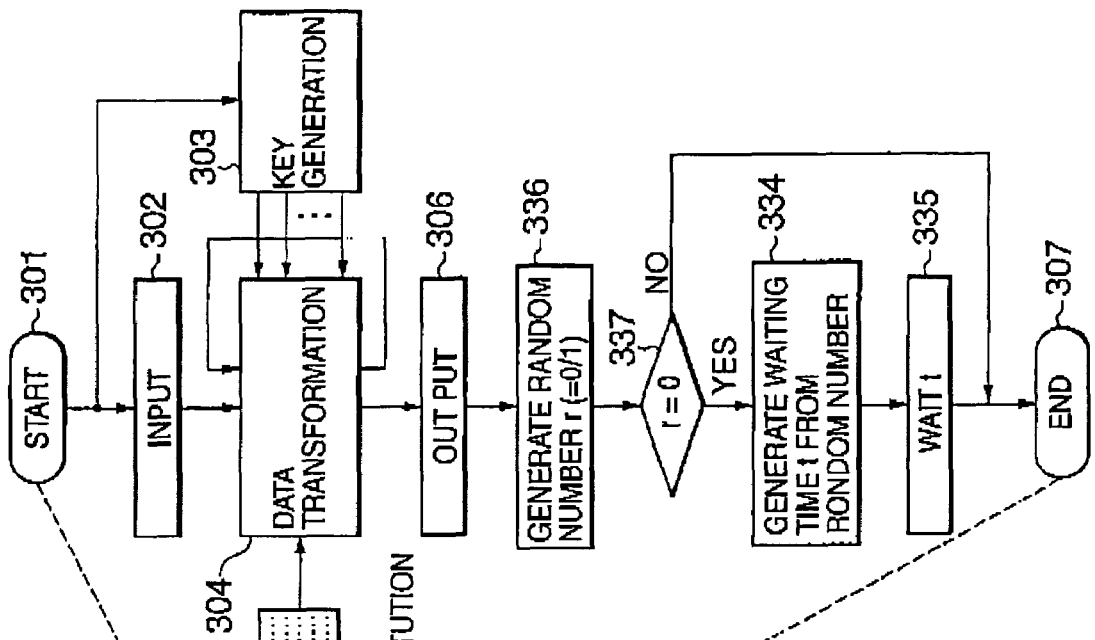

DATA ENCRYPTION SYSTEM AND METHOD

BACKGROUND OF THE INVENTION

1. Field of the Invention

The present invention relates to a data encryption system implemented on a computer having a cache memory placed between a processor and a main memory, and in particular to data encryption system and method of encrypting data using transformation tables such as substitution tables.

2. Description of the Related Art

Symmetric block ciphers such as DES (Data Encryption Standard) ciphers and FEAL (Fast data Encipherment ALgorithm) ciphers typically employ successive iterations, each of which contains operations of exclusive-OR, substitution and coordinate permutation. The substitution is performed by using so-called S boxes, which are substitution boxes or, simply, look-up tables having a predetermined number of possible inputs. In general, S boxes are classified according to the number of input bits, each S box being indicated by Si box, wherein i is the number of input bits, such as S7 box and S9 box. During cipher or decipher for one block, each Si box is referred to a plurality of times.

An example of a conventional encryption system will be described with reference to FIGS. 1A, 1B and 2. As shown in FIG. 1A, an encryption system is composed of a program-controlled processor (here, CPU) 1, a memory (main memory) 2 into which an encryption program 3 is loaded from a disk or the like, and a cache memory 4. The cache memory 4 is connected to the CPU 1 by a processor bus 5 composed of data lines, address lines and control lines and is connected to the memory 2 by a memory bus 6 composed of data lines, address lines and control lines.

As known well, the cache memory 4 is a small-capacity memory allowing high-speed access compared with the main memory 2. The cache memory 4 stores the contents of frequently accessed main memory locations and addresses. When the CPU 1 issues a request for data or instruction through the processor bus 5, the cache memory 4 checks to see whether it holds the same. If it holds the same (cache hit), then the cache memory 4 returns the data to the CPU 1. If it does not hold the same (a cache miss), the cache memory 4 reads a predetermined size of data including the requested data or instruction from the main memory 2 through the memory bus 6 and stores the predetermined size of data while transferring the requested data or instruction to the CPU 1. The predetermined size of data read from the main memory 2 is, for example, 32 bytes or 128 bytes. Since instructions located near the previously executed address are frequently executed, the cache hit rate can be increased by storing such a larger size of data in advance into the cache memory 4, resulting in high-speed access.

The encryption program 3 instructs the CPU 1 to perform a symmetric block cipher such as DES or FEAL cipher. Its program architecture is shown in FIG. 1B. A substitution table section 305 composed of a predetermined number of substitution tables is previously provided in the encryption program 3. For example, each substitution table of the substitution table section 305 has 16 entries each having addresses 0-F(H) assigned thereto and having hexadecimal numbers 0-F stored therein, as shown in FIG. 2. For example, in the case of input bits "0000"=0(H), 8(H) stored at the address 0(H) is react out and a corresponding binary number "1000" is output. As described before, the substitution table section 305 is referenced a plurality of times to perform substitution by a data transformation section 304.

There are proposed several cryptanalytic methods or analyzing the key used in an encryption algorithm, for example, Exhaustive key search, Differential cryptanalysis, and Linear cryptanalysis.

Recently, new cryptanalysis called timing attack which mainly targets public-key encryption systems has been proposed by Paul C. Kocher ("Timing Attacks on Implementations of Diffie-Hellman, RSA, DSS, and Other Systems" Advances in Cryptology: Proceedings of Crypto 96, Plenum Press, 1995, pp 104-113). According to timing attacks, the secret key candidates of a cryptosystem can be narrowed based on differences in the amount of time required to perform power-residue operation that is basic to the public-key cipher.

A technique for preventing time attacks has been disclosed in Japanese Patent Application Unexamined Publication No. 10-222065. A basic idea of this countermeasure is to change in delay time of critical path for each power-residue operation.

However, in the case where the above-described encryption system using the substitution table is implemented on a computer having the cache memory 4 therein, a cache-attack cryptanalysis method, which was found by the present inventor and will be described later, can narrow the key candidates of the encryption system to finally find the entire key by measuring the amount of time required to encrypt data. Since the cache-attack cryptanalysis method can be applied to symmetric ciphers which do not use any power-residue operations, the countermeasure described in the Japanese Patent Application Unexamined Publication No. 10-222065 becomes ineffective.

Cache-Attack Cryptanalysis

As shown in FIG. 3, it is assumed that an encryption device calculates an exclusive OR (XOR) of plain text P0 and an n-bit key k0 to reference an substitution table S and an exclusive OR of plain text P10 and an n-bit key k1 to reference the substitution table S. When different entries are looked up in the substitution table S, the following relationships are obtained:

$$P0.XOR.\ k0 \neq P1.XOR.\ k1,\ \text{and}$$

$$P0.XOR.\ P1 \neq k0.XOR.\ k1 = \Delta k \quad (1),$$

where $\Delta k$ is hereinafter called a key differential.

The formula (1) can be generalized from 2-table model to n-table model as follows:

$$Pi\ .XOR.\ ki \neq Pj\ .XOR.\ kj,\ \text{and}$$

$$Pi\ .XOR.\ Pj \neq ki\ .XOR.\ kj = \Delta kij \quad (2),$$

where $i, j = 1, 2, 3, \ldots n$.

The formula (2) indicates the case where the substitution table S is references n times during cipher/decipher process. In this case, with regard to any two plain text Pi and Pj, an exclusive OR of Pi arid an n-bit key ki and an exclusive OR of Pj and an n-bit key kj look up different entries in the same substitution table S and further an exclusive OR of Pi and Pj is not equal to a key differential $\Delta kij$ which is an exclusive OR of any two keys ki and kj. When such a key differential $\Delta kij$ is obtained, the range of exhaustive key search can be narrowed to $2^{2N} - 2^N$. For example, when N bits of $\Delta k = k0\ .XOR.\ k1$ are obtained, the exhaustive search for N bits of k0 causes N bits of the other k1 to be calculated from the relationship: $k1 = k0.XOR.\ \Delta k$. Accordingly, the exhaustive search for 2N bits of k0 and k1 can be reduced to that for only N bits of k0.

How to obtain the key differential $\Delta kij$ will be described with reference to FIGS. 4A and 4B. First, as shown in FIG. 4A, a counter table is prepared, which contains initialized counters each corresponding to all possible values of the key differential $\Delta kij$.

Subsequently, an arbitrary pair of plain texts is extracted from a set of plain texts, which would cause different entries to be looked up in the substitution table in all rounds of the cipher process. Thereafter, a counting step of incrementing by one a counter corresponding to a value of the key differential $\Delta kij$ which is equal to an exclusive OR of the extracted pair of plain texts is repeatedly performed for all pairs of the plain texts. As a result, the counters of the counter table are updated as shown in FIG. 4B. The counters of the counter table each having finally obtained counter values are searched for a counter value of zero or an extreme small value to identity a corresponding counter, which determines a key differential $\Delta kij$. It should be noted that the extreme small value is a value depending on the provability of satisfying the formula (2).

There will be described a method of obtaining a set of arbitrary plain texts which will cause different entries to be looked up in the substitution table S in all or a considerable amount of accesses in the case where the substitution table S is referenced n times in a cipher/decipher process.

However, when applying such an encryption program on the conventional encryption system having the cache memory 4 as shown in FIG. 1A, there are developed differences in the amount of time required to perform encryption/decryption depending on given plain/cipher text. Provided with different plain texts, the data transformation section 304 may look up different entries in the substitution table, resulting in different cache hit rates when the substitution table is accessed. In other words, among given plain/cipher texts, one providing the highest rate of cache miss needs the longest encryption time. It is estimated that a plain/cipher text providing the highest rate of cache miss increases the possibility of causing different entries to be looked up in the substitution table in all or a considerable amount of accesses.

Verification

The present inventor verified the above estimation using a well-known cipher algorithm MISTY1 proposed by Mitsuru Matsui. Detailed descriptions of MISTY1 are provided by Mitsubishi Electric Corporation (see "Block Cipher algorithms MISTY1 and MISTY2" version 1.11 Oct. 2, 1996, and "Sample Programs of MISTY1 in C Language" version 1.00 Jul. 22 1996).

Referring to FIGS. 5A-5D, MISTY1 is secret-key cipher with 64-bit data block and 128-bit secret key, including a data randomizing section, which uses two functions FOi and FLi. The function FOi uses function FIij, which uses two substitution tables S7 and S9. The substitution table S9 has a 9-bit input and 512 entries (each 32-bit entry in Sample-Program version). The substitution table S7 has a 7-bit input and 128 entries (each 8-bit entry in Sample-Program version).

The data randomizing section includes 8 functions FO1-FO8, each (FOi) of which includes 3 functions FTi1-FTi3. Each of the 3 functions FTi1-FTi3 references the substitution table S9 twice and the substitution table S7 once. Accordingly, during an encryption process, the substitution table S9 is used 48 times (=8×3×2) and the substitution table S7 is used 24 times (=8×3×1).

FIG. 6 shows the distribution of the number of plain texts with respect to cipher time when a number of plain texts are encrypted by MISTY1. FIG. 7 shows the relationship between cipher time and the number of operation entries in substitution table S9. FIG. 8 shows the relationship between cipher time and the number of operation entries in substitution table S7. The number of operation entries is defined as the number of entries, which are used for encryption in a substitution table. The maximum number of operation entries is 48 in the substitution table S9 and 24 in the substitution table S7.

It is understood from FIGS. 6 and 7 that a plain text taking T or more cipher time causes different entries to be looked up in the substitution table S9 for almost all accesses. Therefore, cache miss occurs every time, thereby taking much time for encryption. On the other hand, as shown in FIG. 8, in the substitution table S7, the distribution in the number of operation entries is approximately kept constant independently of the cipher time. Since the substitution table S7 is a small table with 128 entries, almost all entries are loaded into the cache memory 4 after miss hit has been repeated several times, thereby the occurrence of miss hit disappearing. In contrast, the substitution table S9 is a large table with 512 entries and therefore the occurrence of miss hit will not disappear. Such an operation-entry distribution difference between the substitution tables S7 and S9 makes the above-described cache attacks ineffective on the substitution table S7 and effective on the substitution table S9.

FIG. 9 shows an operation of extracting a set of plain texts having a high probability that the substitution table S9 is accessed about 48 times during cipher process. First, the cipher program of MISTY1 is loaded on the memory of a computer (step 101). Thereafter, a plain text is generated using random numbers (step 102) and the cache memory of the computer is cleared (step 103). The generated plain text is set as a plain text to be encrypted (step 104) and the plain text to be encrypted is encrypted by MISTY1 encryption and the time required for encryption is measured (step 105). Subsequently, it is determined whether the measured encryption time is equal to or greater than a predetermined threshold T (step 106). The threshold T is determined so that a necessary and sufficient number of plain texts can be obtained so as to stand the formula (2). The higher the probability of standing the formula (2), the lower the necessary number of plain texts. When the measured encryption time is equal to or greater than the predetermined threshold T (YES in step 106), the plain text is stored (step 107) and the control goes back to the step 102. When the measured encryption time is not greater than the predetermined threshold T (NO in step 106), the control goes back to the step 102 without storing the plain text. The steps 102-107 are repeatedly performed to obtain a sufficient number of plain texts having a high probability that the substitution table S9 is accessed about 48 times during cipher process.

Based on the plain texts obtained like this, the key differential $\Delta k$ is determined using the method as shown in FIGS. 4A and 4B and the key candidates of the encryption system are narrowed. And finally the entire key is determined by using exhaustive search of the narrowed key candidates to determine the remaining bit values of the key.

As described above, in an encryption system implementing the encryption program using substitution tables on a computer having a cache memory, the cache-attack cryptanalysis method can narrow the key candidates of the encryption system to finally find the entire key by measuring the amount or time required to encrypt data. Accordingly, the cache-attack cryptanalysis method may be a kind of timing attack. Since the cache-attack cryptanalysis method can be applied to symmetric ciphers which do not use any power-residue operations, the countermeasure described in the Japanese Patent Application Unexamined Publication No. 10-222065 becomes ineffective.

SUMMARY OF THE INVENTION

An object of the present invention is to provide an encryption system and method, which can provide a defensive measure against the cache-attack cryptanalysis.

According to the present invention, a data encryption system for performing encryption/decryption of a given plain/cipher text using transformation tables which transforms bit strings of the given plain/cipher text, includes: a memory for storing an encryption program including the transformation tables each of which contains a predetermined number of entries, wherein a targeted transformation table is previously identified from the transformation tables depending on whether the targeted transformation table exhibits a trend of increasing in the number of operation entries as a length of encryption time becomes longer; a program-controlled processor for executing the encryption program; a cache memory placed between the memory and the program-controlled processor; and an entry loading section for loading at least one part of the targeted transformation table into the cache memory.

The entry loading section may load the at least one part of the targeted transformation table into the cache memory before the encryption/decryption of the given plain/cipher text. The entry loading section may load all transformation tables into the cache memory, wherein the targeted transformation table is loaded after the other transformation tables have been loaded into the cache memory. The entry loading section may load all transformation tables with priorities into the cache memory, in which a transformation table with higher priority is left longer in the cache memory, wherein higher priority is assigned to the targeted transformation table compared with the other transformation tables. The entry loading section may load the at least one part of the targeted transformation table into the cache memory at a plurality of timings before the encryption/decryption of the given plain/cipher text.

As another aspect of the present invention, the entry loading section includes: a management table containing a plurality of management entries each corresponding to the entries of the targeted transformation table, each management entry indicating whether a corresponding entry of the targeted transformation table has been used; and a unused-entry manager for loading unused entries of the targeted transformation table into the cache memory by referencing the management table.

The targeted transformation table may be identified by calculating a use rate of a number of operation entries to a total number of entries for each of the transformation tables and selecting a transformation table having a smaller use rate as the targeted transformation table.

According to the present invention, a data encryption system for performing encryption/decryption of a given plain/cipher text using transformation tables which transforms bit strings of the given plain/cipher text, includes: a memory for storing an encryption program including the transformation tables each of which contains a predetermined number of entries; a program-controlled processor for executing the encryption program; a cache memory placed between the memory and the program-controlled processor; and a cache-miss generating section for generating a cache miss so as to make a number of cache misses uniform for any plain/cipher text.

The cache-miss generating section may include: a management table containing a plurality of management entries each corresponding to the entries of each transformation table, each of the management entries indicating whether a corresponding entry of the transformation table has been used; and a cache-miss generating section for generating a cache miss a number of times which is equal to a difference between a number of usable entries and a number of used entries of the transformation table, wherein the used entries are identified by referencing the management table.

The cache-miss generating section may include: a count management table containing a plurality of management entries each corresponding to the entries of each transformation table, each of the management entries indicating a number of times a corresponding entry of the transformation table has been referenced; and a cache-miss generating section for generating a cache miss a number of times which is equal to a number of cache hits for the transformation table, wherein the number of cache hits is obtained based on management entries having a count value of at least 2. The cache-miss generating section may generate a cache miss each time a count value of a management entry exceeding 1 is incremented.

The transformation table may be a targeted transformation table which is previously identified from the transformation tables depending on whether the targeted transformation table exhibits a trend of increasing in the number of operation entries as a length of encryption time becomes longer. As a simplified method, the targeted transformation table may be identified by calculating a use rate of a number of operation entries to a total number of entries for each of the transformation tables and selecting a transformation table having a smaller use rate as the targeted transformation table.

According to further another aspect of the present invention, a data encryption system includes a memory for storing an encryption program including the transformation tables each of which contains a predetermined number of entries, which includes at least one transformation table group containing N transformation tables having same contents, wherein a transformation table is referenced N times for an encryption/decryption process of a single plain/cipher text; a program-controlled processor for executing the encryption program; and a cache memory placed between the memory and the program-controlled processor, wherein, each time accessing the transformation table group, a different one of the N transformation tables is referenced within the accessed transformation table group.

As described above, according to the present invention, the number of cache misses for a transformation table can be made uniform for any plain/cipher text, which causes encryption/decryption time to be made substantially equal independently of the number of operation entries for the transformation table. Accordingly, it is very difficult to extract plain texts used to determine a key differential, resulting in difficulties in cryptanalysis.

BRIEF DESCRIPTION OF THE DRAWINGS

FIG. 1A is a block diagram showing an example of a conventional encryption system;

FIG. 1B is a diagram showing a program architecture of the conventional encryption system;

FIG. 2 is a schematic diagram showing an example of a substitution table;

FIG. 3 in a schematic diagram showing a simplified data randomizing section for explanation of a cache-attack cryptanalysis method;

FIG. 4A is a schematic diagram showing an initialized counter table used to obtain a key differential $\Delta k$;

FIG. 4B is a schematic diagram showing a finally obtained counter table to explain how to obtain the key differential $\Delta k$;

FIG. 10A is a block diagram showing an encryption system according to a first embodiment of the present invention;

FIG. 10B is a diagram showing a program architecture of the encryption system according to the first embodiment;

FIG. 11A is a block diagram showing an encryption system according to a second embodiment of the present invention;

FIG. 11B is a diagram showing a program architecture of the encryption system according to the second embodiment;

FIG. 11C is a diagram showing an example of a use-entry management table employed in the encryption system according to the second embodiment;

FIG. 12A is a block diagram showing an encryption system according to a third embodiment of the present invention;

FIG. 12B is a diagram showing a program architecture of the encryption system according to the third embodiment;

FIG. 13A is a block diagram showing an encryption system according to a fourth embodiment of the present invention;

FIG. 13B is a diagram showing a program architecture of the encryption system according to the fourth embodiment;

FIG. 13C is a diagram showing an example of a use-entry management table employed in the encryption system according to the fourth embodiment;

FIG. 14A is a block diagram showing an encryption system according to a fifth embodiment of the present invention;

FIG. 14B is a diagram showing a program architecture of the encryption system according to the fifth embodiment;

FIG. 15A is a block diagram showing a first example of an encryption system according to a sixth embodiment of the present invention;

FIG. 15B is a diagram showing a program architecture of the first example of the encryption system according to the sixth embodiment;

FIG. 16A is a block diagram showing a second example of an encryption system according to the sixth embodiment;

FIG. 16B is a diagram showing a program architecture of the second example of the encryption system according to the sixth embodiment;

FIG. 17A is a block diagram showing an encryption system according to a seventh embodiment of the present invention;

FIG. 17B is a diagram showing a program architecture of the encryption system according to the seventh embodiment;

FIG. 18A is a block diagram showing an encryption system according to an eighth embodiment of the present invention;

FIG. 18B is a diagram showing a program architecture of the encryption system according to the eighth embodiment;

FIG. 20A is a block diagram showing an encryption system according to a tenth embodiment of the present invention; and FIG. 20B is a diagram showing a program architecture of the encryption system according to the tenth embodiment.

DESCRIPTION OF THE PREFERRED EMBODIMENTS

First Embodiment

Figure 5A:
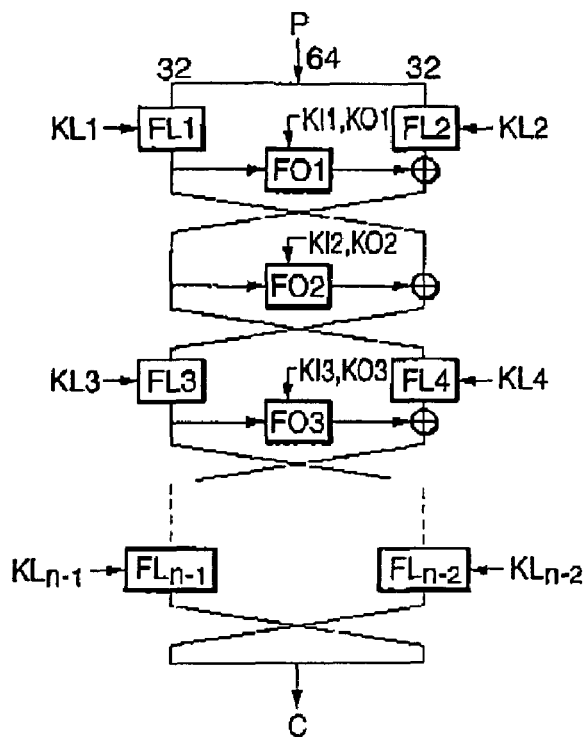
FIG. 5A is a diagram showing a data randomizing section of MISTY1.
Figure 5B:
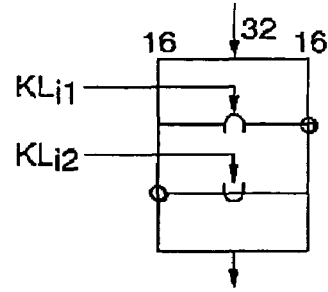
FIG. 5B is a diagram showing the structure of function FLi in the data randomizing section of MISTY1.
Figure 5C:
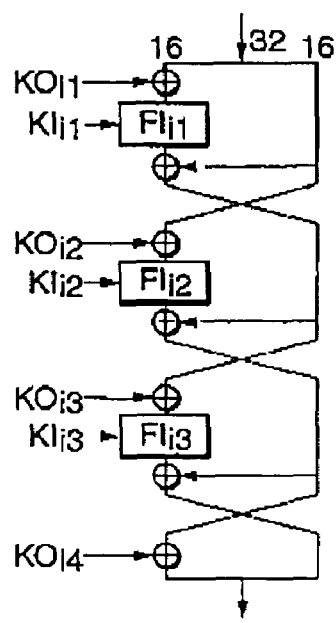
FIG. 5C is a diagram showing the structure of function FOi in the data randomizing section of MISTY1.
Figure 5D:
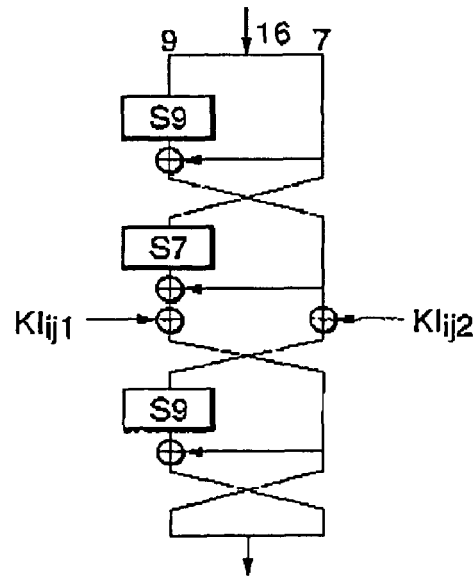
FIG. 5D is a diagram showing the structure of function FIij in the data randomizing section of MISTY1.

Referring to FIG. 10A, an encryption system according to a first embodiment of the present invention is composed of a program-controlled processor (here, CPU) 1, a memory (main memory) 2 into which an encryption program 3A is loaded from a disk or the like, and a cache memory 4. The cache memory 4 is connected to the CPU 1 by a processor bus 5 composed of data lines, address lines and control lines and is connected to the memory 2 by a memory bus 6 composed of data lines, address lines and control lines.

As known well, the cache memory 4 is a small-capacity memory allowing high-speed access compared with the main memory 2. The cache memory 4 stores the contents of frequently accessed main memory locations and addresses. When the CPU 1 issues a request for data or instruction through the processor bus 5, the cache memory 4 checks to see whether a cache hit occurs. It a cache hit occurs, then the cache memory 4 returns the hit data to the CPU 1. If a cache miss occurs, the cache memory 4 reads a predetermined size of data including the requested data or instruction from the main memory 2 through the memory bus 6 and stores the predetermined size of data while transferring the requested data or instruction to the CPU 1. The predetermined size of data read from the main memory 2 is, for example, 32 bytes or 128 bytes.

The encryption program 3A instructs the CPU 1 to perform a symmetric block cipher such as DES or FEAL cipher using a transformation table to perform bit-string transformation. The structure and operation of the encryption program 3A will be described with reference to FIG. 10B.

It should be noted that a major part of encryption operation is the substantially same as that of decryption operation, provided that the key generation and the data transformation in the decryption operation are performed in inverse order. Therefore, hereinafter, encryption and decryption are denoted by encryption/decryption, and an input text is denoted by a plain/cipher text.

Referring to FIG. 10B, the encryption program 3A is composed of a key generation section 303 and a data randomizing section including an input section 302, a preload section 311, a data transformation section 304, and an output section 306. The data transformation section 304 performs substitution using a substitution table section 305, which is composed of a predetermined number of substitution tables.

1) Targeted Substitution Table

Figure 7:
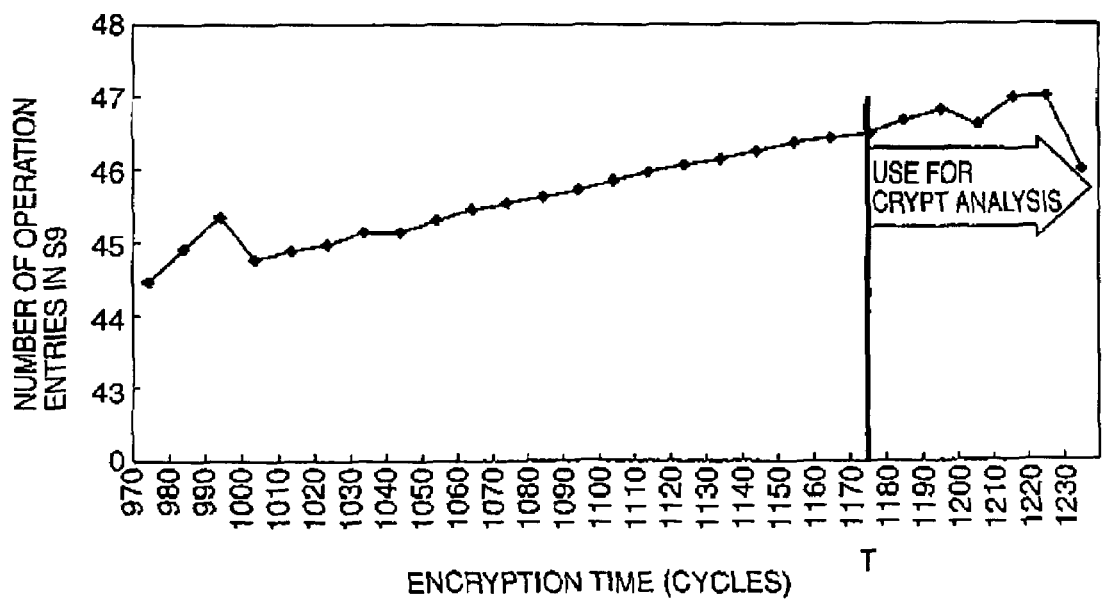
FIG. 7 is a diagram showing the relationship between cipher time and the number of operation entries in substitution table S9.
Figure 8:
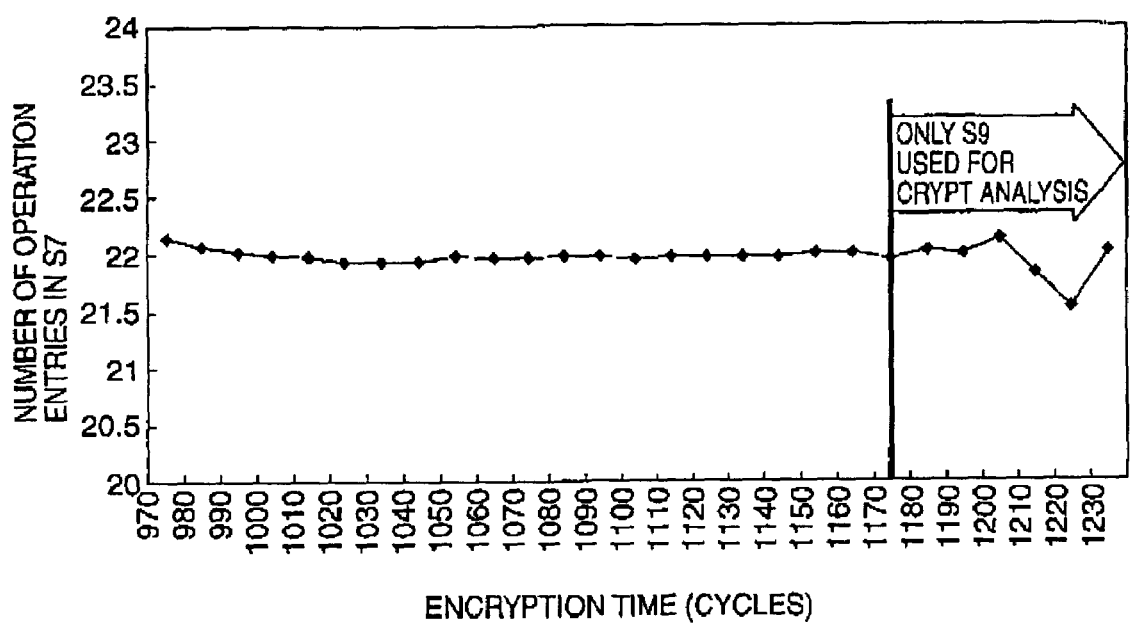
FIG. 8 is a diagram showing the relationship between cipher time and the number of operation entries in substitution table S7.

Among the substitution tables included in the substitution table section 305, a substitution table which is most likely to be attacked (hereafter, a targeted substitution table) is previously selected based on the cipher algorithm of the encryption program 3A. In the case of MISTY1 as shown in FIGS. 5A-5D, the substitution table S9 should be selected as the targeted substitution table because the number of operation entries varies according to encryption time as shown in FIG. 7. In general, a targeted transformation table is a transformation table exhibiting a trend of increasing in the number of operation entries according to encryption time. Alternatively, a simple method for identifying the targeted transformation table is to identify a transformation table having a small use ratio of the total number of referenced entries (operation entries) to the total number of entries.

As shown in FIG. 10B, when the encryption program 3A is called and started (step 301), the input section 302 inputs a plain/cipher text and performs initial permutation thereof. The preload section 311 loads the targeted substitution table into the cache memory 4 before the data transformation section 304.

2) Preloading Scheme

The preload section 311 is an entry loading means for adjusting the number of cache misses to be made approximately equal for any plain/cipher text by preloading all or a part of entries of the targeted substitution table into the cache memory 4. For example, preloading all entries of the targeted substitution table into the cache memory 4 is performed once, which causes the cache hit rate for the targeted substitution table to become 100%, in other words, the cache miss rate for the targeted substitution table to become zero.

The data transformation section 304 repeatedly performs the basic transformation of mixing the plain/cipher text after initial-permutation with extended keys generated by the key generation section 303 by referencing the substitution table section 305. As described before, since the targeted substitution table has been loaded in the cache memory 4 by the preload section 311, there is a high probability that accessing the targeted substitution table causes the occurrence of a cache hit.

For example, when all entries of the targeted substitution table are preloaded into the cache memory 4, the cache hit rate for the targeted substitution table becomes 100%. In other words, the cache miss rate for the targeted substitution table becomes zero. Since the cache miss rate for the substitution tables other than the targeted substitution table is substantially kept at a constant value C, any cipher/decipher text exhibits the approximately same number of cache misses during the encryption/decryption process, causing the time required for encryption/decryption to be approximately equal. Accordingly, it is very difficult to extract plain texts, which are used to determine a key differential Δk that is the keystone in the cache-attack cryptanalysis, resulting in effective defensive measure against the cache-attack cryptanalysis.

The data obtained by the data transformation section 304 is subjected to inverse initial permutation by the output section 306 to produce a finally obtained cipher/plain text, which is returned to the main program that called the encryption program 3A. In this way, the encryption process for a single plain/cipher text is terminated (step 307).

3) Other Preloading Schemes

In the above-described example, only the targeted transformation table which exhibits a trend of increasing in the number of operation entries according to encryption time is preloaded into the cache memory 4. However, the present invention is not limited to this example. If the cache memory 4 has a sufficient capacity, all substitution tables of the substitution table section 305 are preloaded into the cache memory 4. In this case, a substitution table to be left, which is most likely to be attacked, is loaded after other substitution tables have been loaded into the cache memory 4. The reason is that the substitution table to be left is prevented from removal from the cache 4 according to a sweep algorithm such as LRU (Least Recently Used) algorithm.

Alternatively, in the case of a computer having a function of providing priority to data stored in the cache memory 4, since data with higher priority is removed later, the target substitution table should be attached with high priority and be loaded into the cache memory 4.

The first embodiment is directed to the symmetric key encryption such as DES, in which a section of referencing the substitution table section 305 is provided within the data transformation section 304 in the encryption program 3A. Accordingly, the preload section 311 is located immediately before the data transformation section 304. As another preloading scheme, the preloading step of the preload section 311 may be performed immediately after the start step 301. In this case, the first embodiment can be applied to the symmetric key encryption in which not only the data transformation section 304 but also the input section 302 and the key generation section 303 can reference to the substitution table section 305.

Further, the preloading step can be performed at a plurality of locations or timings. For example, the preloading step is performed immediately after the star step 301 and immediately before the data transformation section 304. Furthermore, it is possible to separately call a preloading program for preloading the targeted or necessary substitution table into the cache memory 4 before calling the encryption program 3A.

As described before, the preload section 311 is capable of adjusting the number of cache misses to be made approximately equal for any plain/cipher text by preloading all or a part of entries of the targeted substitution table into the cache memory 4. All entries of the targeted substitution table are not always preloaded into the cache memory 4. For example, about one half of the entries of the targeted substitution table may be preloaded into the cache memory 4. Such part preloading also allows the number of cache misses to be made approximately equal to some extent for any plain/cipher text.

Second Embodiment

Referring to FIG. 11A, an encryption system according to a second embodiment of the present invention is composed of the same hardware components as the first embodiment, the CPU 1, the memory 2, and the cache memory 4, wherein an encryption program 3B is loaded into the memory 2.

Referring to FIG. 11B, the encryption program 3B is composed or a key generation section 303 and a data randomizing section including an input section 302, a data transformation section 304 including a used-entry management section 312, a unused-entry loading section 313, and an output section 306. The data transformation section 304 performs substitution using the substitution table section 305, which is composed of a predetermined number of substitution tables.

The used-entry management section 312 uses a management table to manage entries, which have been actually used in encryption/decryption process among the entries of the substitution table section 305.

The unused-entry loading section 313 accesses and loads entries which have not been actually used in encryption/decryption process among the entries of the substitution table section 305. A combination of the used-entry management section 312 and the unused-entry loading section 313 provides a an entry loading means for adjusting the number of cache misses to be made approximately equal for any plain/cipher text. Hereafter, the used-entry management section 312 and the unused-entry loading section 313 will be described in detail.

FIG. 11C shows an example of the management table of the used-entry management section 312. The management table is provided for each substitution table having a high probability of attacks by the cache-attack cryptanalysis and has as many entries as a corresponding substitution table. Each entry of the management table is initialized to a value indicating that it is not used at the start time of encryption/decryption process. In FIG. 11C, "unused" is denoted by a symbol "X". Every time an entry of a substitution table having a high probability of attacks is referenced during the encryption/decryption process, a corresponding entry of a corresponding management table is changed to a value indicative or "used". In FIG. 11C, "used" is denoted by a symbol "O". In other words, the entry of the substitution table corresponding to an entry labeled with "O" in the management table is an operation entry.

When the substitution table section 305 is not referenced in the encryption/decryption process any longer, the unused-entry loading section 313 references the management table of FIG. 11C to execute loading, that is, referencing and reading, all entries that have never been referenced, for each substitution table having a high probability of attacks.

Figure 9:
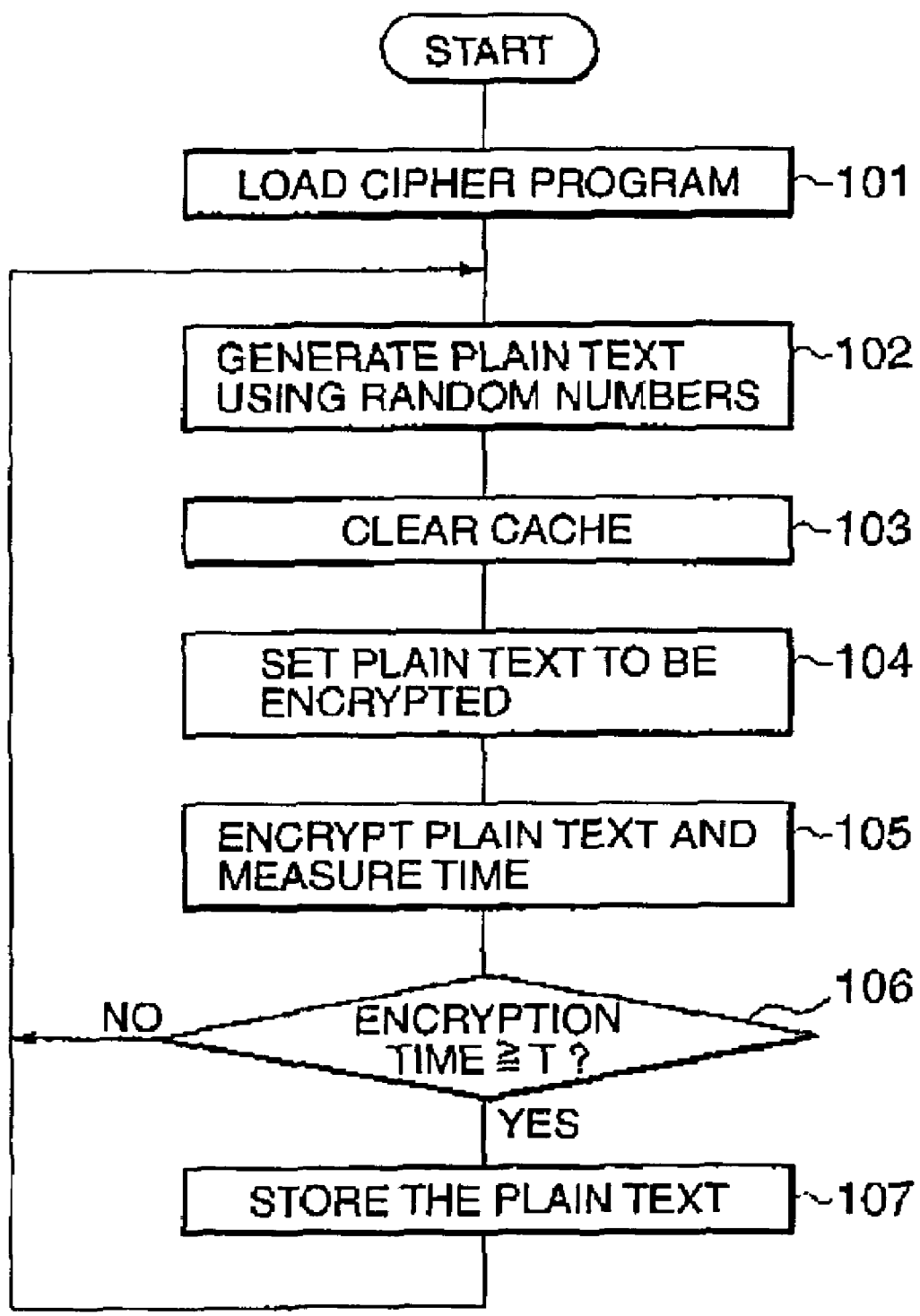
FIG. 9 is a flowchart showing an operation of extracting a set of plain texts having a high probability that the substitution table S9 is accessed about 48 times during cipher process.

Assuming the substitution table S9 of MISTY1 as the substitution table having a high probability of attacks, the total number of entries in the substitution table S9 is 512, and the maximum number of operation entries operating in encryption/decryption for a single text is 48. As described in FIG. 9, attackers may clear the substitution table S9 before starting the encryption program 3B and therefore, when a single plain text is encrypted, the maximum number of cache misses for the substitution table S9 is 48. It is further assumed that, when a single plain text is encrypted, the minimum number or cache misses for the substitution table S9 is 1, which may not be developed.

In the case where the number of cache misses is a maximum of 48, the number of operation entries is also 48 and therefore the unused-entry loading section 313 reads 464 (=512−48) entries. In this case, the number of cache misses becomes "a small certain value" because there are left in the cache memory 4 many other entries that have never been referenced in the substitution table S9 after 48 cache misses have occurred. On the other hand, in the case where the number of cache misses is a minimum of 1, the number of operation entries is also 1 and therefore the unused-entry loading section 313 reads 511 (=512−1) entries. In this case, the number of cache misses becomes "a large certain value" because there are not left in the cache memory 4 many other entries that have never been referenced in the substitution table S9 after only one cache miss have occurred. Accordingly, the finally obtained number of cache misses becomes 48+"a small certain value" when the number of cache misses is the maximum of 48, and 1, "a large certain value" when the number of cache misses is the minimum of 1, which means that the difference between them becomes smaller. This provides the countermeasure against the cache-attack cryptanalysis based on the same reason as the first embodiment as described before.

In the above description, the unused entries for only substitution tables having a high probability of cache-attack are loaded in the unused-entry loading section 313. The unused entries for all substitution tables may be loaded to achieve the similar advantages.

Third Embodiment

Referring to FIG. 12A, an encryption system according to a third embodiment of the present invention is composed of the same hardware components as the first embodiment: the CPU 1, the memory 2, and the cache memory 4, wherein an encryption program 3C is loaded into the memory 2.

Referring to FIG. 12B, the encryption program 3C is composed or a key generation section 303 and a data randomizing section including an input section 302, a data transformation section 304 including a used-entry management section 312, a cache-miss generation section 314, and an output section 306.

The data transformation section 304 performs substitution using the substitution table section 305, which is composed of a predetermined number of substitution tables.

The used-entry management section 312 uses a management table to manage entries, which have been actually used in encryption/decryption process among the entries of the substitution table section 305.

The cache-miss generation section 314 generates as many cache misses as a difference between the maximum number of usable entries and the number of actually used entries in a encryption/decryption process. A combination of the used-entry management section 312 and the cache-miss generation section 314 provides a cache-miss adjusting means for adjusting the number of cache misses to be made approximately equal for any plain/cipher text. Hereafter, the used-entry management section 312 and the cache-miss generation section 314 will be described in detail.

The management table of the used entry management section 312 as described before (sec FIG. 11C) is provided for each substitution table having a high probability of attacks by the cache-attack cryptanalysis and has as many entries as a corresponding substitution table. When the substitution table section 305 is not referenced in the encryption/decryption process any longer, the cache-miss generation section 314 references the management table of FIG. 11C to calculate an adjusting value that is a difference between the maximum number of usable entries and the number of actually used entries for each substitution table having a high probability of attacks. Thereafter, the cache-miss generation section 314 generates as many cache misses as the adjusting value. Such cache-miss generation can be performed by, for example, issuing a read request to the memory 2 at intervals of a time period equal to or longer than the data size that is permitted to be written into the cache 4 at a time.

As in the case of the first embodiment, consider the substitution table S9 of MISTY1 as the substitution table having a high probability of attacks, having 512 entries and up to 48 operation entries. As described in FIG. 9, attackers may clear the substitution table S9 before starting the encryption program 3B and therefore, when a single plain text is encrypted, the maximum number of cache misses for the substitution table S9 is 48. It is further assumed that, when a single plain text is encrypted, the minimum number of cache misses for the substitution table S9 is 1.

In the case where the number of cache misses is a maximum of 48, the number of operation entries is also 48 and therefore the cache-miss generation section 314 calculates the adjusting value of 0 (=48−48). Therefore, no further cache miss is generated. On the other hand, in the case where the number of cache misses is a minimum of 1, the number of operation entries is also 1. Therefore the cache-miss generation section 314 calculates the adjusting value of 47 (=48−1) and generates a cache miss 47 times, resulting in the finally obtained number of cache misses being 48 (=1+47). In this manner, the number of cache misses is made uniform. This provides the effective countermeasure against the cache-attack cryptanalysis based on the same reason as the first embodiment as described before.

In the above description, the cache-miss generation is performed for only substitution tables having a high probability of cache-attack. The cache-miss generation may be performed for all substitution tables to achieve the similar advantages.

Fourth Embodiment

Referring to FIG. 13A, an encryption system according to a fourth embodiment of the present invention is composed of the same hardware components as the first embodiment: the CPU 1, the memory 2, and the cache memory 4, wherein an encryption program 3D is loaded into the memory 2.

Referring to FIG. 13B, the encryption program 3D is composed of a key generation section 303 and a data randomizing section including an input section 302, a data transformation section 304 including a used-entry management section 315, a cache-miss generation section 316, and an output section 306. The data transformation section 304 performs substitution using the substitution table section 305, which is composed of a predetermined number of substitution tables.

The used-entry management section 315 uses a management table to manage the number of cache hits for the substitution table section 305 in encryption/decryption process. The cache-miss generation section 316 generates as many cache misses as the cache hits. A combination of the used-entry management section 315 and the cache-miss generation section 316 provides a cache-miss adjustment means for adjusting the number of cache misses to be made approximately equal for any plain/cipher text. Hereafter, the used-entry management section 315 and the cache-miss generation section 316 will be described in detail.

FIG. 13C shows an example of the management table of the used-entry management section 315. The management table is provided for each substitution table having a high probability of attacks by the cache-attack cryptanalysis and has as many entries as a corresponding substitution table. Each entry of the management table is initialized to zero at the start time of encryption/decryption process. Every time an entry of a substitution table having a high probability of attacks is referenced during the encryption/decryption process, the used-entry management section 315 increments a corresponding entry of a corresponding management table by one.

When the substitution table section 305 is not referenced in the encryption/decryption process any longer, the cache-miss generation section 315 references the management table of FIG. 13C to calculate the total number of cache hits and generates as many cache misses as the cache hits. Such cache-miss generation can be performed by, for example, issuing a read request to the memory 2 at intervals of a time period equal to or longer than the data size that is permitted to be written into the cache 4 at a time.

As in the case of the first embodiment, consider the substitution table S9 of MISTY1 as the substitution table having a high probability of attacks, having 512 entries and up to 48 operation entries. As described in FIG. 9, attackers may clear the substitution table S9 before starting the encryption program 3B and therefore, when a single plain text is encrypted, the maximum number of cache misses for the substitution table S9 is 48. It is further assumed that, when a single plain text is encrypted, the minimum number of cache misses for the substitution table S9 is 1.

In the case where the number of cache misses is a maximum of 48, the number of operation entries is also 48 and therefore 48 entries of the management table of FIG. 13C have a value of 1 and the remaining entries have an initial value of 0. The cache-miss generation section 316 obtains the total number of cache hits by calculating the sum of values obtained by subtracting 1 from the value of each of entries that is not smaller than 2. In this case, the total number of cache hits is 0. Therefore, no further cache miss is generated, resulting in the total number of cache misses being 48. On the other hand, in the case where the number of cache misses is a minimum of 1, the number of operation entries is also 1. Therefore, one entry of the management table of FIG. 13C has a value of 48 and the remaining entries have an initial value of 0. The cache-miss generation section 316 calculates 47 (=48−1) cache hits and generates a cache miss 47 times, resulting in the finally obtained number of cache misses being 48 (=1+47). In this manner, the number of cache misses is made uniform. This provides the effective countermeasure against the cache-attack cryptanalysis based on the same reason as the first embodiment as described before.

In the above description, the cache-miss generation is performed for only substitution tables having a high probability of cache-attack. The cache-miss generation may be performed for all substitution tables to achieve the similar advantages.

As a second example of the present embodiment, the used-entry management section 315 may have a function of generating a cache miss. The used-only management section 315 monitors the management table of FIG. 13C and, every time a cache hit occurs and thereby the incremented value of any entry becomes equal to or greater than 2, the used-entry management section 315 generates a cache miss once. This second example can also provide the effective countermeasure similar to the above-described first example.

Fifth Embodiment

Referring to FIG. 14A, an encryption system according to a fifth embodiment of the present invention is composed of the same hardware components as the first embodiment: the CPU 1, the memory 2, and the cache memory 4, wherein an encryption program 3E is loaded into the memory 2.

Referring to FIG. 14B, the encryption program 3E is composed of a key generation section 303 and a data randomizing section including air input section 302, a data transformation section 304, and an output section 306. The data transformation section 304 performs substitution by referencing a substitution table section 305.

Assuming that a substitution table is referenced N times for an encryption/decryption process of a single plain/cipher text, the substitution table section 305 is composed of a plurality of substitution tables including a targeted substitution table group containing N targeted substitution tables 305-1 to 305-N having the same contents.

When a single plain/cipher text is encrypted by the data transformation section 304 referencing the substitution table section 305, the data transformation section 304, each time accessing the targeted substitution table group, references a different one of the targeted substitution tables 305- to 305-N within the accessed targeted substitution table group.

As described above, with each reference to the targeted substitution table group, some cache misses inevitably occur, making the number of cache misses for each substitution table uniform for any plain/cipher text.

The substitution table section 305 may be composed of a plurality of substitution tables, which are divided into a predetermined number of substitution table groups, each group containing N substitution tables 305-1 to 305-N having the same contents.

Sixth Embodiment

According to a sixth embodiment of the present invention, a length of encryption/decryption time is adjusted so as to make it difficult to determine a key differential. Here, two examples of the sixth embodiment will be described below.

1) First Example

Referring to FIG. 15A, an encryption system according to a first example of the sixth embodiment of the present invention is composed of the same hardware components as the first embodiment: the CPU 1, the memory 2, and the cache memory 4, wherein an encryption program 3F is loaded into the memory 2.

Referring to FIG. 15B, the encryption program 3F is composed of a key generation section 303 and a data randomizing section including a timer start section 321, an input section 302, a data transformation section 304, an output section 306, a timer determination section 322, and a waiting section 323. A timer T used in the sixth embodiment may be a timer incorporated in the CPU 1 or a software routine included in the encryption program 3F. The data transformation section 304 performs substitution using the substitution table section 305, which is composed of a predetermined number of substitution tables. A combination of the timer start section 321, the timer determination section 322, and the waiting section 323 provides a time adjustment means for adjusting a length of encryption/decryption time for any plain/cipher text to a predetermined time.

When the encryption program 3F is called and started (step 301), the timer start section 321 starts the timer T and the input section 302 inputs a plain/cipher text and performs initial permutation thereof. The data transformation section 304 performs the substitution using the key generation section 303 and the substitution table section 305 as described before.

The data obtained by the data transformation section 304 is subjected to inverse initial permutation by the output section 306 to produce a finally obtained cipher/plain text. Thereafter, the timer determination section 322 determines whether the current time count of the timer T is smaller than a predetermined maximum time Tmax. When it is determined that T<Tmax (YES), the waiting section 323 prolongs the encryption/decryption time by a difference time interval Tmax−T. When it is determined that T>=Tmax (NO) or the waiting section 323 completes the waiting step, the finally obtained cipher/plain text is returned to the main program that called the encryption program 3F. In this way, the encryption/decryption process for a single plain/cipher text is terminated (step 307).

Figure 6:
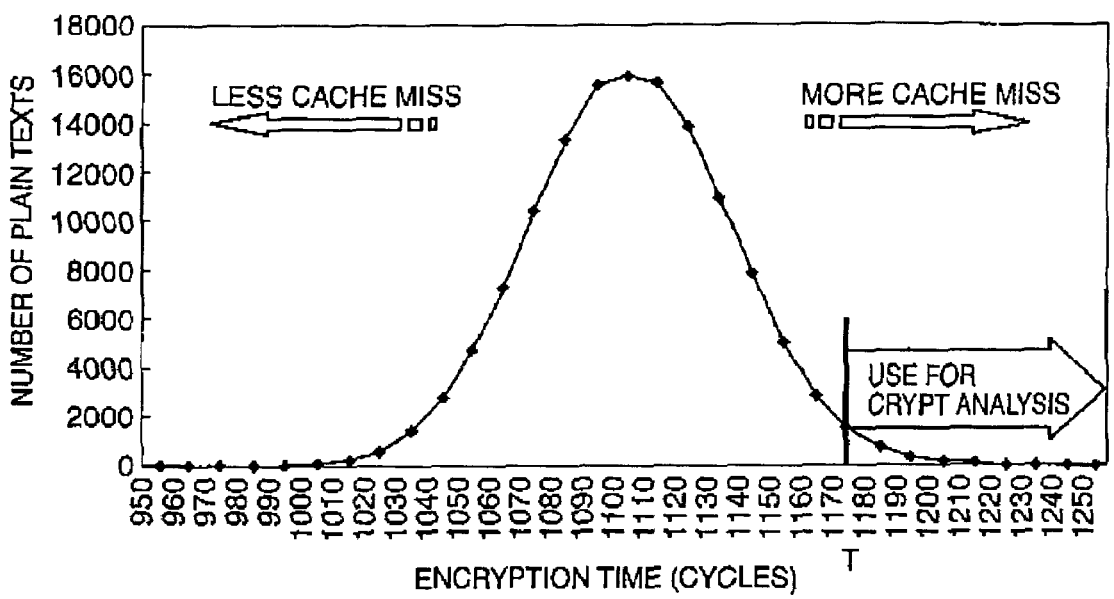
FIG. 6 is a graph showing the distribution of the number of plain texts with respect to cipher time when a number of plain texts are encrypted by MISTY1.

The maximum time Tmax is determined depending on the encryption time distribution. For example, the maximum encryption time as shown in FIG. 6 may he used as the maximum time Tmax. A time slightly longer than the maximum encryption time in FIG. 6 may be used as the maximum time Tmax.

According to the first example of the sixth embodiment, a length of encryption/decryption time for any plain/cipher text is made uniform at around the maximum encryption time. Accordingly, the first example provides the effective countermeasure against the cache-attack cryptanalysis.

2) Second Example

Referring to FIG. 16A, an encryption system according to a second example of the sixth embodiment is composed of the same hardware components as the first embodiment: the CPU 1, the memory 2, and the cache memory 4, wherein an encryption program 3G is loaded into the memory 2.

Referring to FIG. 16B, the encryption program 3G is the same as the encryption program 3F of FIG. 15B, provided that the time weighting section 323 is replaced with a constant waiting section 324. Here, a combination of the timer start section 321, the timer determination section 322, and the constant waiting section 324 provides a time adjustment means for adjusting a length of encryption/decryption time for any plain/cipher text. As described before, the timer determination section 322 determines whether the current time count of the timer T is smaller than a predetermined maximum time Tmax. When it is determined that T<Tmax (YES), the constant waiting section 324 prolongs the encryption/decryption time by a constant time period Tc.

As in the case of the maximum time Tmax, the constant time period Tc can be also determined depending on the encryption time distribution. For example, the constant time period Tc is set to a half the maximum encryption time. A time period slightly shorter or longer than a half the maximum encryption time in FIG. 6 may be used as the constant time period Tc. Since the peak of the distribution is located around the center as shown in FIG. 6, a peak of encryption time distribution after the constant waiting section 324 is shifted to around the maximum encryption time. Accordingly, plain/cipher texts exhibiting the actual maximum encryption time are mixed with the shifted peak of the distribution of FIG. 6, and thereby making it very difficult to extract plain texts used to determine a key differential and providing an effective countermeasure against the cache-attack cryptanalysis.

Seventh Embodiment

According to a seventh embodiment of the present invention, a length of encryption/decryption time is adjusted so as to make it difficult to determine a key differential.

Referring to FIG. 17A, an encryption system according to the seventh embodiment is composed of the same hardware components as the first embodiment: the CPU 1, the memory 2, and the cache memory 4, wherein an encryption program 3H is loaded into the memory 2.

Referring to FIG. 17B, the encryption program 3F is composed of a key generation section 303 and a data randomizing section including a timer start section 321, an input section 302, a data transformation section 304, an output section 306, a timer determination section 322, a first random number generation section 325, a random number determination section 326, a second random number generation section 327, and a waiting section 328. A timer T used in the seventh embodiment may be a timer incorporated in the CPU 1 or a software routine included in the encryption program 3H. The data transformation section 304 performs substitution using the substitution table section 305, which is composed of a predetermined number of substitution tables. A combination of the timer start section 321, the timer determination section 322, the first random number generation section 325, the random number determination section 326, the second random number generation section 327, and the waiting section 328 provides a time adjustment means for adjusting a length of encryption/decryption time for any plain/cipher text In FIG. 17B, program sections similar to those previously described with reference to FIG. 15B are denoted by the same reference numerals and the descriptions thereof will be omitted. When the timer determination section 322 determines that T<Tmax (YES), the first random number generation section 325 generates a random number r which is either 0 or 1. When the random number determination section 326 determines that r=0 (YES), the second random number generation section 327 generates a waiting time t from random number generation. The waiting time t is randomly determined within a range from 0 to the maximum encryption time. The waiting section 328 prolongs the encryption/decryption time by the generated waiting time t. When it is determined that T>−Tmax (NO), when r=1, or the waiting section 328 completes the waiting step, the finally obtained cipher/plain text is returned to the main program that called the encryption program 3H. In this way, the encryption/decryption process for a single plain/cipher text is terminated (step 307).

Accordingly, the characteristic of the encryption time distribution as shown in FIG. 6 becomes indeterminate, resulting in that plain/cipher texts exhibiting the actual maximum encryption time and other plain/cipher texts are developed in the same encryption time zone. This makes it very difficult to extract plain texts used to determine a key differential and therefore provides an effective countermeasure against the cache-attack cryptanalysis.

Eighth Embodiment

According to an eighth embodiment of the present invention, a length of encryption/decryption time is adjusted so as to make it difficult to determine a key differential.

Referring to FIG. 18A, an encryption system according to the eighth embodiment is composed of the same hardware components as the first embodiment: the CPU 1, the memory 2, and the cache memory 4, wherein an encryption program 3I is loaded into the memory 2.

Referring to FIG. 18B, the encryption program 3I is composed of a key generation section 303 and a data randomizing section including an input section 302, a data transformation section 304, an output section 306, a random number generation section 331, a random number determination section 332, and a constant waiting section 333. The data transformation section 304 performs substitution using the substitution table section 305, which is composed of a predetermined number of substitution tables. A combination of the random number generation section 331, the random number determination section 332, and the constant waiting section 333 provides a time adjustment means for adjusting a length of encryption/decryption time for any plain/cipher text.

In FIG. 18B, program sections similar to those previously described are denoted by the same reference numerals and the descriptions thereof will be omitted. When the output section 306 produces a finally obtained cipher/plain text, the random number generation section 331 generates a random number r which is either 0 or 1. When the random number determination section 332 determines that r=0 (YES), the waiting section 333 prolongs the encryption/decryption time by a constant waiting time period Tc. When r−1 or when the waiting section 333 completes the waiting step, the finally obtained cipher/plain text is returned to the main program that called the encryption program 3I. In this way, the encryption/decryption process for a single plain/cipher text is terminated (step 307).

The constant time period Tc can be determined depending on the encryption time distribution as described in FIG. 16B. For example, the constant time period Tc is set to a half the maximum encryption time. A time period slightly shorter or longer than a half the maximum encryption time in FIG. 6 may be used as the constant time period Tc.

Accordingly, the characteristic of the encryption time distribution as shown in FIG. 6 becomes indeterminate, resulting in that plain/cipher texts exhibiting the actual maximum encryption time do not provide the same encryption time and these are developed in the same encryption time zone as other plain/cipher texts. This makes it very difficult to extract plain texts used to determine a key differential and therefore provides an effective countermeasure against the cache-attack cryptanalysis.

It should be noted that the waiting section 333 may be located at any location of the encryption program 3I as shown in FIG. 18B. Alternatively, it is possible to distribute the waiting step of the waiting section 333 among the encryption program 3I as shown in FIG. 18B.

Ninth Embodiment

According to a ninth embodiment of the present invention, a length of encryption/decryption time is adjusted so as to make it difficult to determine a key differential.

Figure 19B:
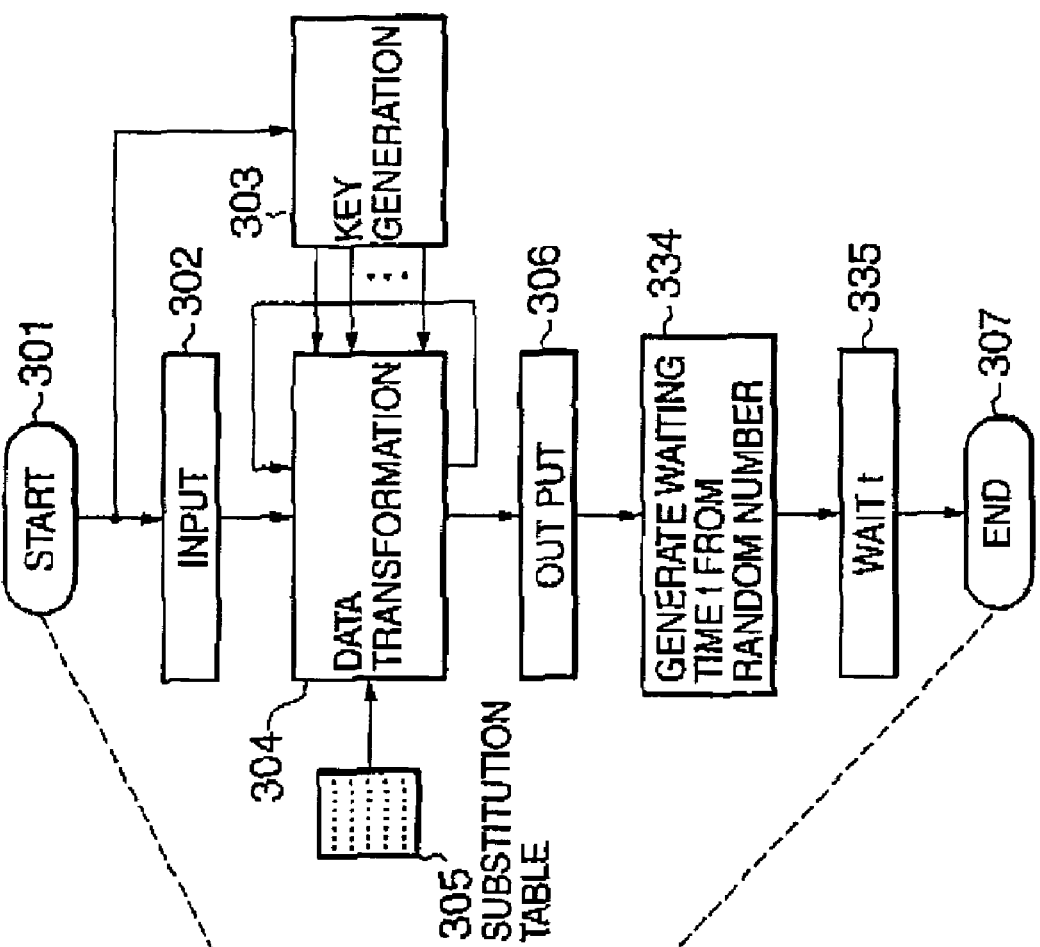
FIG. 19B is a diagram showing a program architecture of the encryption system according to the ninth embodiment.
Figure 19A:
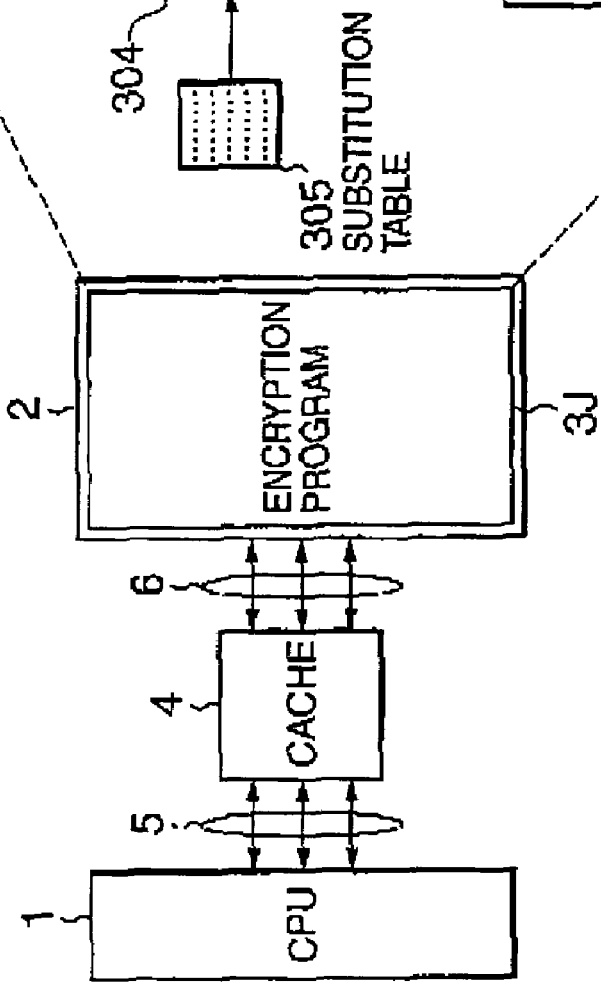
FIG. 19A is a block diagram showing an encryption system according to a ninth embodiment of the present invention.

Referring to FIG. 19A, an encryption system according to the ninth embodiment is composed of the same hardware components as the first embodiment: the CPU 1, the memory 2, and the cache memory 4, wherein an encryption program 3J is loaded into the memory 2.

Referring to FIG. 19D, the encryption program 3J is composed of a key generation section 303 and a data randomizing section including an input section 302, a data transformation section 304, an output section 306, a random number generation section 334, and a waiting section 335. The data transformation section 304 performs substitution using the substitution table section 305, which is composed of a predetermined number of substitution tables. A combination of the random number generation section 334, and the waiting section 335 provides a time adjustment means for adjusting a length of encryption/decryption time for any plain/cipher text.

In FIG. 19B, program sections similar to those previously described are denoted by the same reference numerals and the descriptions thereof will be omitted. When the output section 306 produces a finally obtained cipher/plain text, the random number generation section 334 generates a waiting time t from random number generation. The waiting time t is randomly determined within a range from 0 to the maximum encryption time. The waiting section 335 prolongs the encryption/decryption time by the generated waiting time t. Thereafter, the finally obtained cipher/plain text is returned to the main program that called the encryption program 3J. In this way, the encryption/decryption process for a single plain/cipher text is terminated (step 307).

Accordingly, the characteristic of the encryption time distribution as shown in FIG. 6 becomes indeterminate, resulting in that plain/cipher texts exhibiting the actual maximum encryption time do not provide the same encryption time and these are developed in the same encryption time zone as other plain/cipher texts. This makes it very difficult to determine a key differential and therefore provides an effective countermeasure against the cache-attack cryptanalysis.

The waiting section 335 may be located at any location of the encryption program 3J as shown in FIG. 19B. Alternatively, it is possible to distribute the waiting step of the waiting section 333 to a plurality of locations in the encryption program 3J as shown in FIG. 19B.

Tenth Embodiment

According to a tenth embodiment of the present invention, a length of encryption/decryption time is adjusted so as to make it difficult to determine a key differential.

Referring to FIG. 20A, an encryption system according to the tenth embodiment is composed of the same hardware components as the first embodiment; the CPU 1, the memory 2, and the cache memory 4, wherein an encryption program 3K is loaded into the memory 2.

Referring to FIG. 20B, the encryption program 3K is composed of a key generation section 303 and a data randomizing section including an input section 302, a data transformation section 304, an output section 306, a first random number generation section 336, a random number determination section 337, a second random number generation section 334, and a waiting section 335. The data transformation section 304 performs substitution using the substitution table section 305, which is composed of a predetermined number of substitution tables. A combination of the first random number generation section 336, the random number determination section 337, the second random number generation section 334, and the waiting section 335 provides a time adjustment means for adjusting a length of encryption/decryption time for any plain/cipher text.

In FIG. 20B, program sections similar to those previously described with reference to FIG. 19B are denoted by the same reference numerals and the descriptions thereof will be omitted. When the output section 306 produces a finally obtained cipher/plain text, the first random number generation section 336 generates a random number r, which is either 0 or 1. When the random number determination section 337 determines that r=0 (YES), the second random number generation section 334 generates a waiting time t from random number generation. The waiting time t is randomly determined within a range from 0 to the maximum encryption time. The waiting section 335 prolongs the encryption/decryption time by the generated waiting time t. When r=1, or the waiting section 335 completes the waiting step, the finally obtained cipher/plain text is returned to the main program that called the encryption program 3K. Therefore, the second random number generation section 334 and the waiting section 335 are allowed to operate only when r–0.

Accordingly, the characteristic of the encryption time distribution as shown in FIG. 6 becomes indeterminate, resulting in that plain/cipher texts exhibiting the actual maximum encryption time do not provide the same encryption time and these are developed in the same encryption time zone as other plain/cipher texts. This makes it very difficult to determine a key differential and therefore provides an effective countermeasure against the cache-attack cryptanalysis.

The waiting section 335 may be located at any location of the encryption program 3K as shown in FIG. 20B. Alternatively, it is possible to distribute the waiting step of the waiting section 333 to a plurality of locations in the encryption program 3K as shown in FIG. 20B.

The invention claimed is:

1. A data encryption system for performing encryption/decryption of a given plain/cipher text using transformation tables which transforms bit strings of the given plain/cipher text, comprising:
a memory for storing an encryption program including the transformation tables, each of which contains a predetermined number of entries, wherein a targeted transformation table is previously identified from the transformation tables depending on whether the targeted transformation table exhibits a trend of increasing in the number of operation entries as a length of encryption time becomes longer;
a program-controlled processor for executing the encryption program;
a cache memory placed between the memory and the program-controlled processor; and
an entry loading section that loads all transformation tables into the cache memory, wherein the targeted transformation table is loaded after the other transformation tables have been loaded into the cache memory.

2. The data encryption system according to claim 1, wherein the entry loading section loads the at least one part of the targeted transformation table into the cache memory before the encryption/decryption of the given plain/cipher text.

3. The data encryption system according to claim 2, wherein the entry loading section loads all transformation tables with priorities into the cache memory, in which a transformation table with higher priority is left longer in the cache memory, wherein higher priority is assigned to the targeted transformation table compared with the other transformation tables.

4. The data encryption system according to claim 2, wherein the entry loading section loads the at least one part of the targeted transformation table into the cache memory at a plurality of timings before the encryption/decryption of the given plain/cipher text.

5. The data encryption system according to claim 1, wherein the entry loading section comprises:
a management table containing a plurality of management entries, each corresponding to the entries of the targeted transformation table, each management entry indicating whether a corresponding entry of the targeted transformation table has been used; and
a unused-entry manager for loading unused entries of the targeted transformation table into the cache memory by referencing the management table.

6. The data encryption system according to claim 1, wherein the targeted transformation table is identified by calculating a use rate of a number of operation entries to a total number of entries for each of the transformation tables and selecting a transformation table having a smaller use rate as the targeted transformation table.

7. A data encryption program stored on a computer readable medium, the program operable to cause a cache-equipped computer to perform encryption/decryption of a given plain/cipher text using transformation tables which transforms bit strings of the given plain/cipher text, comprising steps of:
a) receiving plain/cipher text;
b) generating the transformation tables each of which contains a predetermined number of entries, wherein a targeted transformation table is previously identified from the transformation tables depending on whether the targeted transformation table exhibits a trend of increasing in the number of operation entries as a length of encryption time becomes longer;
c) loading transformation tables other than the targeted transformation table into the cache memory, and after having loaded the transformation tables other than the targeted transformation table, loading the targeted transformation table into the cache memory;
d) performing data transformation of bit strings of the given plain/cipher text; and
e) outputting transformed plain/cipher text.

8. The data encryption program stored on a computer readable medium according to claim 7, wherein the step c) comprises the step of:
loading all transformation tables with priorities into the cache memory where a transformation table with higher priority is left longer, wherein higher priority is assigned to the targeted transformation table compared with the other transformation tables.

9. The data encryption program stored on a computer readable medium according to claim 7, wherein the at least one part of the targeted transformation table is loaded into the cache memory at a plurality of timings before the data transformation of the given plain/cipher text.

10. The data encryption program stored on a computer readable medium according to claim 7, wherein the step c) comprises steps of:

preparing a management table containing a plurality of management entries, each corresponding to the entries of the targeted transformation table, each of which indicates whether a corresponding entry of the targeted transformation table has been used; and loading unused entries of the targeted transformation table into the cache memory by referencing the management table.

11. The data encryption program stored on a computer readable medium according to claim 7, wherein the targeted transformation table is identified by calculating a use rate of a number of operation entries to a total number of entries for each of the transformation tables and selecting a transformation table having a smaller use rate as the targeted transformation table.

12. A data encryption method for performing encryption/decryption of a given plain/cipher text using transformation tables which transforms bit strings of the given plain/cipher text, the method comprising steps of:

a) generating the transformation tables each of which contains a predetermined number of entries, wherein a targeted transformation table is previously identified from the transformation tables depending on whether the targeted transformation table exhibits a trend of increasing in the number of operation entries as a length of encryption time becomes longer;

b) loading transformation tables other than the targeted transformation table into a cache memory of a computer, and after having loaded the transformation tables other than the targeted transformation table, loading at least one part of the targeted transformation table into the cache memory; and loading at least one part of the targeted transformation table into a cache memory of a computer; and c) performing data transformation of bit strings of the given plain/cipher text.

* * * * *

UNITED STATES PATENT AND TRADEMARK OFFICE
CERTIFICATE OF CORRECTION

PATENT NO. : 7,454,016 B2
APPLICATION NO. : 10/669269
DATED : November 18, 2008
INVENTOR(S) : Yukiyasu Tsunoo It is certified that error appears in the above-identified patent and that said Letters Patent is hereby corrected as shown below:

On the Cover Page of the Letters Patent in the Foreign Application Priority Data section (30) please delete "Sep. 26, 2000" and add -- Sep. 26, 2002 --

Signed and Sealed this

Thirteenth Day of January, 2009

JON W. DUDAS
*Director of the United States Patent and Trademark Office*